United States Patent [19]

Church et al.

[11] Patent Number: 5,794,234
[45] Date of Patent: Aug. 11, 1998

[54] METHOD AND SYSTEM FOR PROVIDING ELECTRONIC COMMERCE BETWEEN INCOMPATIBLE DATA PROCESSING SYSTEMS

[75] Inventors: Craig A Church, Palo Alto; Joel Chaban, San Rafael, both of Calif.; Mark Erbaugh, Grove City, Ohio

[73] Assignee: The EC Company, Palo Alto, Calif.

[21] Appl. No.: 696,630

[22] Filed: Aug. 14, 1996

[51] Int. Cl.$^6$ .................................................. G06F 15/163
[52] U.S. Cl. ............................... 707/4; 707/10; 705/16; 705/30; 705/35; 395/200.31; 395/200.43
[58] Field of Search ........................ 707/4, 10; 705/35, 705/30, 16; 395/200.31, 200.43

[56] References Cited

U.S. PATENT DOCUMENTS

| | | | |
|---|---|---|---|
| 4,951,196 | 8/1990 | Jackson | 364/401 |
| 5,202,977 | 4/1993 | Pasetes et al | 395/500 |
| 5,367,664 | 11/1994 | Magill et al. | 395/575 |
| 5,390,247 | 2/1995 | Fischer | 380/25 |
| 5,410,675 | 4/1995 | Shreve et al. | 395/500 |
| 5,557,780 | 9/1996 | Edwards et al. | 395/500 |

OTHER PUBLICATIONS

"The State of Financial EDI/Corporate EFT" (EDI Forum, Journal of Electronic Data Interchange, Special Edition: Introduction to Electronic Data Interchange; pub. EDI Group, Ltd., vol. 4, 1991, p. 43).

"The Language of X12 EDI" (EDI Forum, Journal of Electronic Data Interchange, Special Edition: Introduction to Electronic Data Interchange; pub. EDI Group, Ltd., vol. 4, 1991, p.202).

"The Impact of EDI Standards Version Releases on the EDI Community" (EDI Forum, Journal of Electronic Data Interchange, Special Edition: Introduction to Electronic Data Interchange; pub. EDI Group, Ltd., vol. 4, 1991, pp. 208–225).

"EDI Products and Services" (EDI Forum, Journal of Electronic Data Interchange, Special Edition: Introduction to Electronic Data Interchange; pub. EDI Group, Ltd., vol. 4, 1991, p. 227).

"Selecting a Value–Added Network" (EDI Forum, Journal of Electronic Data Interchange, Special Edition: Introduction to Electronic Data Interchange; pub. EDI Group, Ltd., vol. 4, 1991, pp. 252–256).

*Primary Examiner*—Thomas G. Black
*Assistant Examiner*—Jean R. Homere
*Attorney, Agent, or Firm*—Gary S. Williams; Flehr Hohbach Test Albritton & Herbert LLP

[57] ABSTRACT

A system and method that provides the exchange of electronic data interchange (EDI) and electronic fund transfers (EFT) type transactions between trading partners having incompatible accounting database systems is herein provided. The system utilizes a distributed network system connecting one or more client computers representing trading partners and banking institutions to a network server. Each client computer stores data representing EDI and EFT type transactions in an accounting database having a file format that differs from one or more of its associated trading partners. A set of transactions are extracted from an accounting database and converted into a universal file format that is used to exchange data between the various client computers. The universal file format utilizes a freestyle format that accommodates any data element associated with the transactions and is not constrained to a predefined format. The exchange of data between any of the client computers is transmitted through the network server. The network server transmits the data to the appropriate destination client computer as well as perform one or more value added services prescribed by the client computers.

27 Claims, 12 Drawing Sheets

Document and Data Header Format

Data element definition for standard data elements

Data element definition for user-defined data elements

```
 1 [<DOCMST;N;;>10007;D;8;.....|10008;T;8;.....|10006;C;6;.....|10005;C;12;.....|10009;C;12;.....]
 2 [<PODOCD;Y;;>10001;C;35;.....|10000;C;35;.....|10002;C;35;.....|10402;C;35;.....|10442;C;35;.....|10407;C;35;.....|10415;C;35;.....|11317;D;8;.....|10413;N;14;2;.....|12241;C;35;.....|12242;N;
 3  14;2;.....|12243;C;35;.....|12244;N;14;2;.....|12245;C;35;.....|12247;C;35;.....|126445;N;14;2;.....]
 4 [<PODOCH;Y;;>10001;C;35;.....|10000;C;35;.....|10002;C;35;.....|10003;D;8;.....|10004;N;14;2;.....|10402;C;35;.....|10408;C;35;.....|11781;C;35;.....|11782;C;35;.....|11783;C;35;.....|11784;C;
 5  35;.....|11785;C;35;.....|11883;C;35;.....|11786;C;35;.....|11787;C;35;.....|11788;C;35;.....|11789;C;35;.....|11790;C;35;.....|11791;C;35;.....|11792;C;35;.....|11794;C;35;.....|11795;C;35;.....|11796;C;35;.....|11797;C;35;.....|11
 6  882;C;35;.....|11883;C;35;.....|11884;C;35;.....|11885;C;35;.....|11886;C;35;.....|11887;C;35;.....|11888;C;35;.....|11890;C;35;.....|11889;C;35;.....|11892;C;35;.....|11893;C;35;.....|11896;C;35;.....|11897;C;35;.....|11
 7  .....|11898;C;35;.....|11899;C;35;.....|12651;C;35;.....|10407;C;35;.....|10434;C;35;.....|10436;C;35;.....|10439;C;35;.....|11317;D;8;.....|11443;C;35;.....|11568;C;35;.....|10438;N;14;2;.....]
 8 [<EFORDD;Y;;>10001;C;35;.....|10000;C;35;.....|10002;C;35;.....|10221;C;35;.....|11194;D;8;.....|11305;D;8;.....|11184;C;35;.....|12441;C;35;.....|12924;N;14;2;.....|90002;C;3
 9  5;.....|"Promotion Description"]
10 [<EFORDH;Y;;>10001;C;35;.....|10000;C;35;.....|10002;C;35;.....|10003;D;8;.....|10004;N;14;2;.....|11181;C;35;.....|11739;C;35;.....|11921;C;35;.....|11922;C;35;.....|11923;C;35;.....|11924;C;35;.....|11925;C
11  ;35;.....|11926;C;35;.....|11927;C;35;.....|11928;C;35;.....|11929;C;35;.....|11930;C;35;.....|11931;C;35;.....|11932;C;35;.....|11937;C;35;.....|11938;C;35;.....|11939;C;35;.....|11741;C;35;.....|11742;C;35;.....|11
12  743;C;35;.....|11744;C;35;.....|11745;C;35;.....|11746;C;35;.....|11747;C;35;.....|11748;C;35;.....|11749;C;35;.....|11750;C;35;.....|11751;C;35;.....|11752;C;35;.....|11755;C;35;.....|11756;C;35;.....|11757;C;35;.....
13  .....|11758;C;35;.....|11759;C;35;.....|11194;D;8;.....|11184;C;35;.....]
14 DOCMST;19960807;102556;"1";"DEMO56";"ABC111111GHF";
15 EFORDH;19960807;"APVEND";"EAST29";"MERB1398";19960807;100.00;"C";"farfel@alpo.com";"ALPO DOG FOOD COMPANY";"FARFEL JONES";"KIBBLE MASTER";"123 POO POO WAY";"P.O. BOX
16  12345";"BUILDING 20";"DOG HOUSE 19";"ROOM 87A";"BOWSER";"WISCONSIN";"98765";"U.S.A.";"415-555-1212";"415-555-1213";"415-555-1214";"THE EC COMPANY";"CRAIG CHURCH";"1705 EL
17  CAMINO DR.";"  ";"  ";"  ";"PALO ALTO";"CA";"94309";"U.S.A.";"415-321-7816";"aduncan@eccompany.com";"415-323-7500";"415-323-2378";"PRESIDENT";19960807;"C";
18  EFORDD;19960807;"APVEND";"EAST29";"MERB1398";"BUYER1";"BLANKET12345";19960807;"O";"  ";100.00;"August Buyer Promotion";
19  PODOCH;19960807;"APVEND";"EAST25";"MERB1399";19960807;500.00;"JCHA";"666555444";"WHSE1";"THE EC COMPANY";"PETER CLARK";"CFO";"1705 EL CAMINO REAL";"OFFICE OF THE
20  CONTROLLER";"TREASURY DEPARTMENT";"ACCOUNTS PAYABLE";"SMALL BILLS AND CLAIMS DEPARTMENT";"PALO ALTO";"CA";"94309";"U.S.A.";"A";"415-323-2378";"415-459-7500";"415-
21  321-7816";"THE EC COMPANY";"BILL FOREMAN";"WAREHOUSE FORMAN";"1705 1/2 EL CAMINO REAL";"SHIPPING DOCK 5";"WAREHOUSE 7";"  ";"PALO ALTO";"94309";"U.S.A.";"415-323-
22  2378";"CA";"415-321-7816";"415-323-7500";"67-1234567";"12-345-678";"666555";"UPS";"MONEY";"WEST";19960807;"FOB";"2/10/NET30";0.00;
23  PODOCD;"APVEND";"EAST25";"MERB1399";"JCHA";"WHSE1";"12-345-678";"UPS";"5432";19960807;100.00;"ABC222";1.00;"EACH";100.00;"666555";"PROFESSIONAL UMPIRES WHISTLE";0.00;
24  PODOCD;"APVEND";"EAST25";"MERB1399";"JCHA";"WHSE1";"12-345-678";"UPS";"5432";19960807;100.00;"ABC222";1.00;"EACH";100.00;"666555";"PROFESSIONAL UMPIRES WHISTLE";0.00;
25  PODOCD;"APVEND";"EAST25";"MERB1399";"JCHA";"WHSE1";"12-345-678";"UPS";"5432";19960807;100.00;"ABC222";1.00;"EACH";100.00;"666555";"PROFESSIONAL UMPIRES WHISTLE";0.00;
26  PODOCD;"APVEND";"EAST25";"MERB1399";"JCHA";"WHSE1";"12-345-678";"UPS";"5432";19960807;100.00;"ABC222";1.00;"EACH";100.00;"666555";"PROFESSIONAL UMPIRES WHISTLE";0.00;
27  PODOCD;"APVEND";"EAST25";"MERB1399";"JCHA";"WHSE1";"12-345-678";"UPS";"5432";19960807;100.00;"ABC222";1.00;"EACH";100.00;"666555";"PROFESSIONAL UMPIRES WHISTLE";0.00;
```

FIGURE 5G

METHOD AND SYSTEM FOR PROVIDING ELECTRONIC COMMERCE BETWEEN INCOMPATIBLE DATA PROCESSING SYSTEMS

The present invention relates generally to the field of electronic commerce and specifically to distributed computer systems supporting electronic commerce between various trading partners.

BACKGROUND OF THE INVENTION

The interconnection of various data processing systems has encouraged the growth of electronic commerce. More and more businesses are employing communication networks to exchange business transactions between various trading partners. This electronic exchange has the advantage of providing new levels of efficiency which allow businesses to maintain a competitive advantage. In order to facilitate the communication between various data processing systems, standards have been proposed which dictate the structure and manner in which data is exchanged.

Currently, a large portion of the business world utilizes electronic data interchange (EDI) for the transmission of various business documents between one or more trading partners. Such documents include purchase orders, invoices, price changes, bills of lading, etc. There are a number of standards associated with EDI and each differs in the manner in which data is formatted, defined, and transmitted. Some of the standards are specific to certain industries (e.g., ANSIx12 is widely used in the administration, commerce and transport industry) and others pertain to a particular manufacturer. Likewise, banking institutions utilize an electronic funds transfer (EFT) standard for the exchange of information relating to electronic payments.

In a business application that utilizes EDI, translation software is employed to transform data from the business application's format to the particular EDI standard prior to transmission to a trading partner. This exchange requires that both trading partners utilize the same EDI standard and requires the use of translation software to conform to the standard. The standard dictates which data elements are transmitted and a precise format for transmitting them. A limitation of this type of communication scheme is that a trading partner can only communicate with those trading partners utilizing the same standard. In addition, only data specified by the standard is transmitted and only in the required format.

Furthermore, the exchange of transactions is between different trading partners. For electronic payments, additional processing is required to finalize the transaction which is typically handled by a bank. Since banking institutions utilize the EFT standard, an additional process is required to convert the transaction to the EFT standard.

Accordingly, an impediment to the growth of electronic commerce is the need for a more robust electronic network scheme providing an integrated business transaction system that can accommodate various incompatible data formats with minimal alteration to an existing business application.

It is an object of the present invention to provide a more robust business transaction processing system.

It is another object of the present invention to provide a business transaction processing system between a number of business trading partners incorporating incompatible data processing systems.

It is another object of the present invention to provide a secure network for the exchange of electronic commerce between various business trading partners.

It is yet another object of the present invention to provide an automated system for the electronic exchange of electronic fund transfers and electronic data interchange type transactions between various business trading partners.

It is a further object of the present invention to link various corporate accounting data processing systems.

It is a further object of the present invention to provide a mechanism that links electronic funds transfer and electronic data interchange type transactions between existing corporate accounting data processing systems.

It is another object of the present invention to provide a system and method that combines electronic funds transfer, electronic data interchange, and value added services for various business trading partners.

Other general and specific objects of this invention will be apparent and evident from the accompanying drawings and the following description.

SUMMARY OF THE INVENTION

An electronic commerce distributed system that provides for the exchange of financial and business data between associated client computers utilizing incompatible data formats is herein provided. The electronic distributed system contains a secure network providing restricted access to an electronic commerce community that comprises certain client computers and at least one network server. The client computers represent one or more trading partners and/or banking institutions that communicate with each other in order to efficiently process business and financial data that represent EDI and EFT type transactions.

Each of the client computers stores its data in an accounting database incorporating a data format that is incompatible with one or more of its trading partners. Since several different data formats can be utilized, a universal data format is used to transmit data between each computing system connected to the network. The universal file format is a freestyle format that accommodates any data element associated with a particular trading partner's accounting database without regard to a predefined order. Transmitted data is converted from the format of the accounting database to the universal file format in order to transmit the data to a trading partner and/or banking institution. The received data is then converted from the universal file format to an appropriate format of the destination client computer.

All data transmitted in the electronic commerce distributed system is encrypted and transported to the network server. The network server distributes the data into one or more transmission files which are reencrypted and routed to the appropriate client computer. Financial data representing EFT type transactions are also routed to the appropriate banking institution. Value added services prescribed by one or more of the client computers are also performed by the network server.

BRIEF DESCRIPTION OF THE DRAWINGS

Additional objects and features of the invention will be more readily apparent from the following detailed description and appended claims when taken in conjunction with the drawings, in which:

FIGS. 5A–5G illustrate the universal file format in a preferred embodiment of the present invention.

DESCRIPTION OF THE PREFERRED EMBODIMENTS

Figure 1:
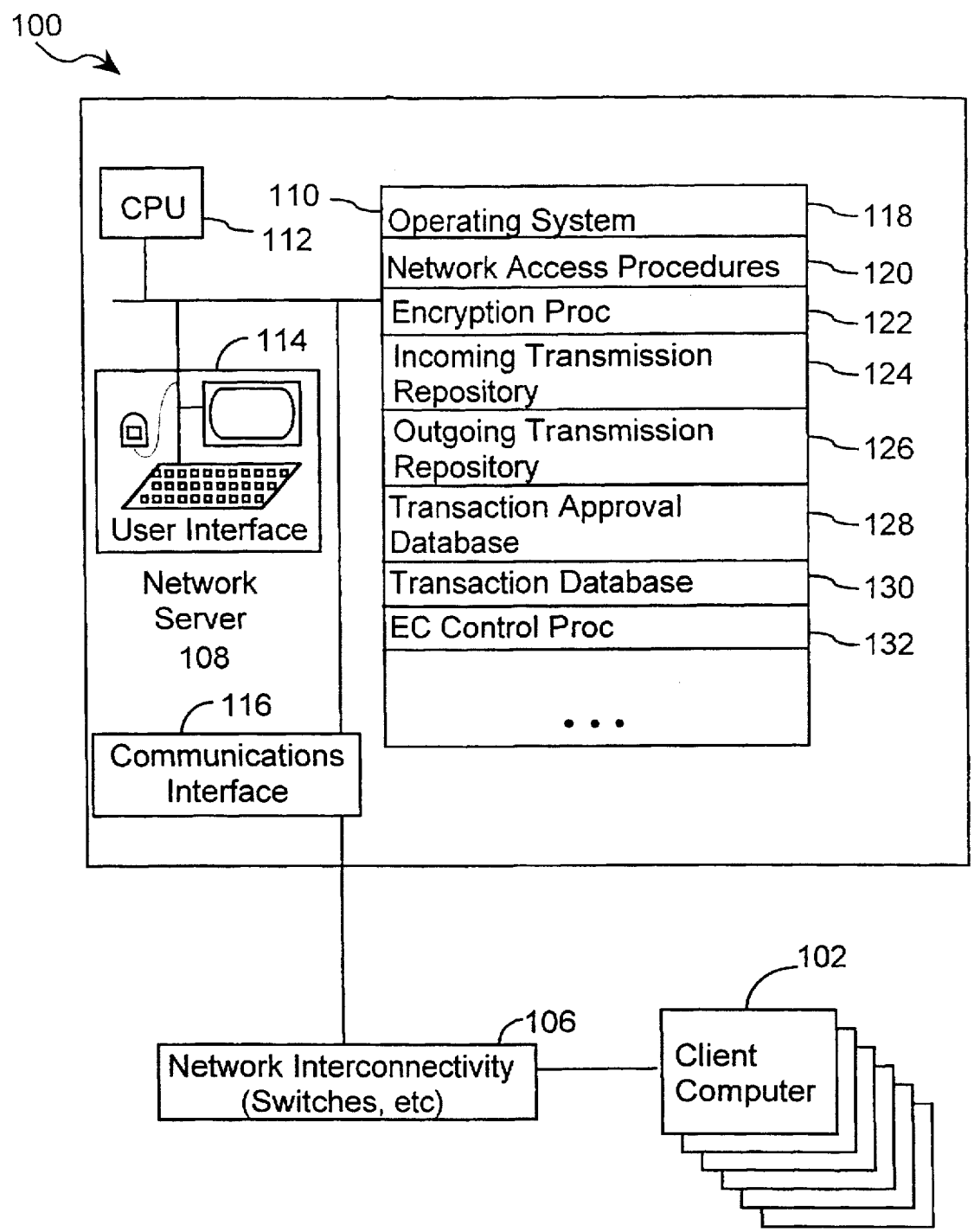
FIG. 1 is a block diagram of a computer system incorporating a preferred embodiment of the present invention.
Figure 2:
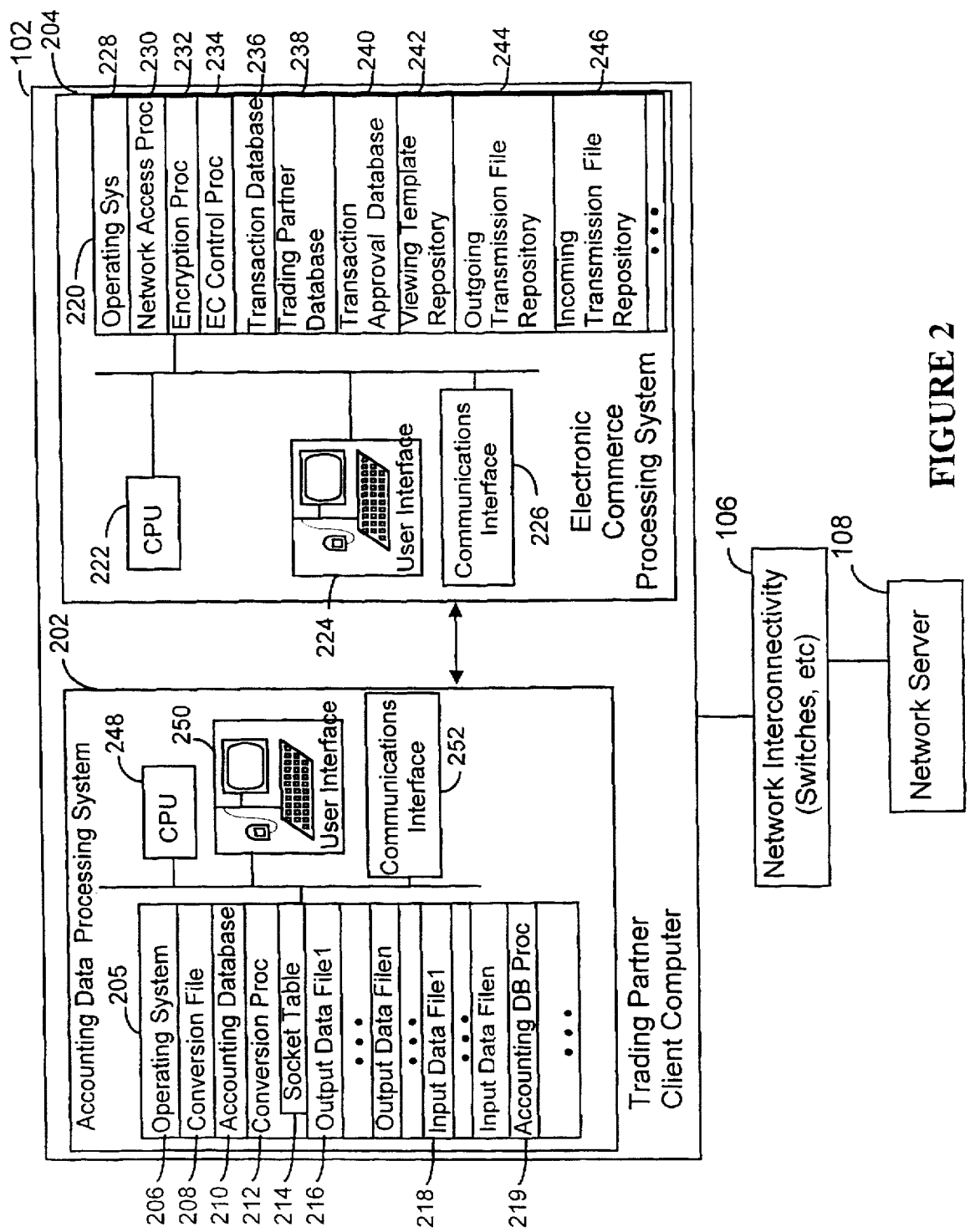
FIG. 2 is a block diagram of a trading partner client computer in the computer system of FIG. 1.
Figure 3:
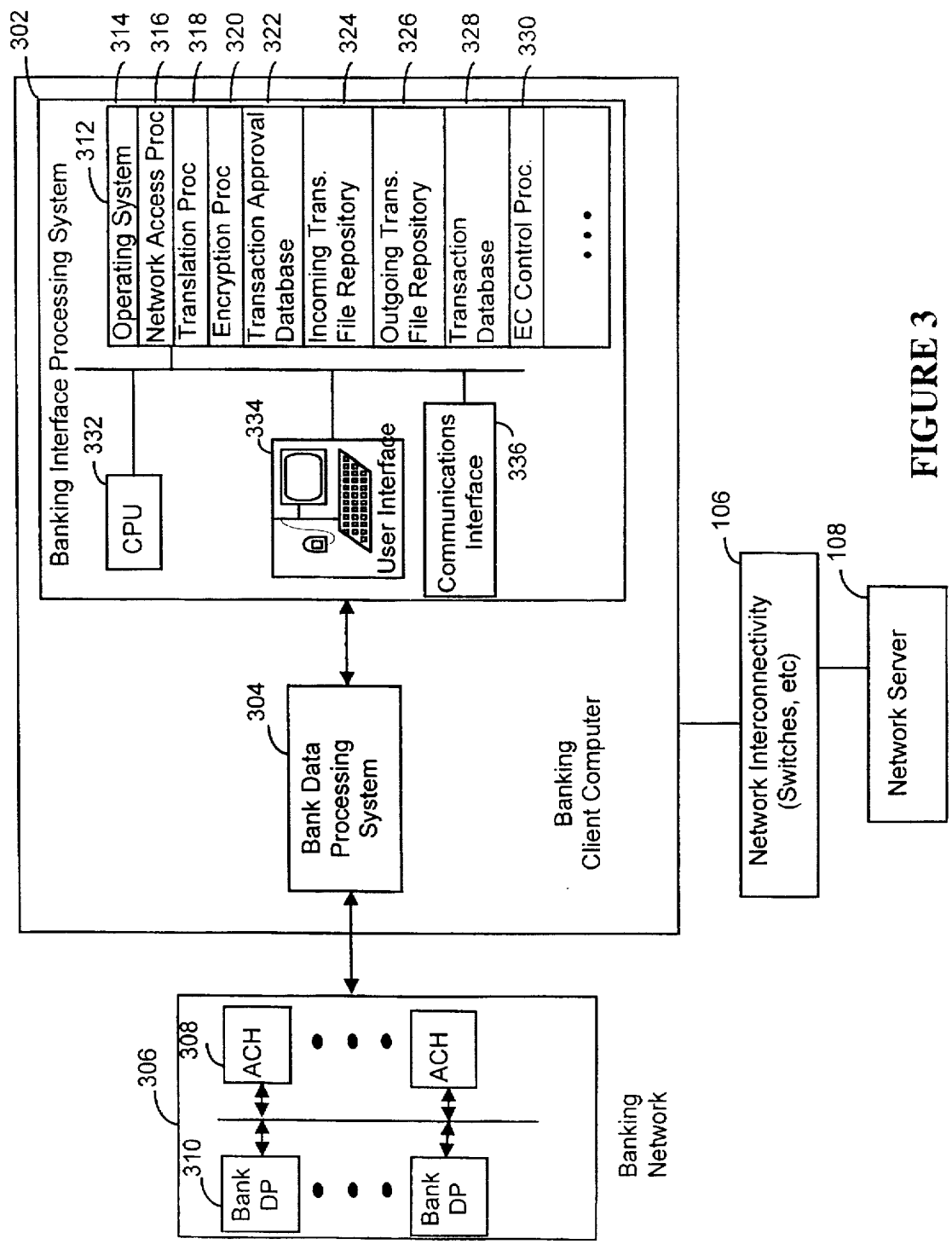
FIG. 3 is a block diagram of a banking client computer in the computer system of FIG. 1.

FIGS. 1–3 illustrate the preferred embodiment of the computer system of the present invention. Referring to FIGS. 1, 2 and 3, there is shown a distributed computer system 100 having many client computers 102. Each client computer 102 can be connected to at least one server computer 108 through a network interconnectivity means 106. Network interconnectivity means 106 can be any type of communications link or network that interconnects various data processing systems. Preferably, the network interconnectivity means 106 is a private network providing limited access between client computers 102 subscribing to a network service provider.

In the preferred embodiment, the distributed computer system 100 is an electronic commerce system that handles the transmission and routing of electronic fund transfers (EFT) type transactions and electronic data interchange type transactions (EDI) between various trading partners and banks that are represented as client computers 102. (It should be noted that the present invention distinguishes between data formatted in accordance with an EDI or EFT standard and an EDI and EFT type transaction. An EDI-type transaction includes business and financial data representing purchase orders, invoices, price quotations, and the like. Similarly, an EFT-type transaction consists of electronic payment information. A specially designated server computer referred to as the network server 108 is used to facilitate transmissions between the trading partners and the banks. A client computer 102 can be associated with a particular trading partner or a specific bank.

A client computer 102 that represents a trading partner has an accounting data processing system 202 and an electronic commerce interface processing system 204. The accounting data processing system 202 includes an accounting database 210 storing various accounting data representing business and financial transactions. The data format of the accounting databases 210 typically varies between each trading partner since one of several types of accounting database software systems can be utilized. For this reason, a universal data format is utilized in the transmission of the transactions between the various trading partners. A conversion procedure 212 is employed to transform accounting data in the format of an originating trading partner to the universal file format and from the universal file format to the accounting data format of a recipient trading partner.

The conversion procedure 212 utilizes a set of output data files 216 that contain data extracted from the accounting database 210 slated for transmission to one or more trading partners. Each of the output data files 216 contains data relating to a particular type of transaction. The conversion procedure 212 reads through each output data file 216 extracting the data from the accounting database 210 to a socket table 214 having a universal data format. The conversion procedure 212 utilizes a conversion file 208 that is tailored for the particular data format associated with the trading partner's accounting database 210. The conversion file 208 specifies the manner in which the output data files 216 are to be interpreted. The data in the socket table 214 is then transmitted to the electronic commerce data processing system 204.

The electronic commerce processing system 204 stores the received data in a transaction database 236 also incorporating the universal file format. One or more end users associated with the trading partner can view the transactions and process them. The end user can then initiate transmission by selecting an appropriate software button or command. Once this selection is made, the electronic commerce (EC) control procedure 234 then generates one or more transmission files that are encrypted and transmitted to the network server 108. In addition, the electronic commerce processing system 204 provides a trading partner database 238 that stores information on those trading partners eligible to receive transactions. The end user can alter this information as desired.

All transmissions through the electronic commerce system 100 are transmitted to the network server 108. The network server 108 decrypts each file and stores a copy of each transaction in its transaction database 130. The transactions are then collated and distributed into another set of transmission files destined to a respective client computer. The transmission files are encrypted using a different encryption key and/or encryption method than used by the sending client computer. Electronic payment transactions are also routed to one or more respective originating banks. The network server 108 can also perform additional value added services as well such as but not limited to reporting, statistical analysis, and the like.

A trading partner client computer 102 receives one or more incoming transmission files 246 from the network server 108. The incoming transmission files are decrypted using a private encryption key available to the trading partner and a decryption procedure 232. The transactions contained in each of these files is stored in the transaction database 236. One or more end users associated with the trading partner client computer 102 can view these transactions through a user interface 224 and indicate whether or not the transactions are to be received into the accounting system. When receipt of the transactions is indicated, the electronic commerce processing system 204 extracts the transactions from the transaction database 236 in the universal file format and places them into one or more input data files 218. The accounting database procedure 219 reads the input data files 218 at a later time.

A client computer associated with a bank data processing system 304 has a bank interface processing system 302. The bank interface processing system 302 interfaces with the network 106 transmitting and receiving transmission files incorporating the universal file format. The transmission files received by the bank interface processing system 302 preferably contain electronic payment information or electronic funds transfer data. The bank data processing system 304 is coupled to a banking network 306 that can include one or more automated clearing houses 308 in communication with one or more banking data processing systems 310.

A banking client computer receives one or more incoming transmission files 324 from the network server 108. The transactions contained in these files typically consist of electronic payment information or electronic funds transfer data. These transactions indicate that the associated bank data processing system 304 is to debit and/or credit a specified amount from one or more trading partners' account at the bank 304. The transaction is then converted to the appropriate ACH format and transmitted to the banking network 306 which continues the settlement process.

Referring to FIG. 1, the network server 108 can include a central processing unit (CPU) 112, a memory 110, a user interface 114, and a communications interface 116 for communication with the client computers 102 via the communications network 106.

In the primary memory 110 of network server 108, there can be stored the following:

an operating system 118;

network access procedures 120;

an encryption procedure 122 that is used to encrypt and decrypt incoming and outgoing transmission files, additionally the encryption procedure can be utilized to compress and decompress these files;

a repository of incoming transmission files 124;

a repository of outgoing transmission files 126;

a transaction approval database 128 that stores information pertaining to the requirements for approving certain types of transactions;

a transaction database 130 that stores one or more transactions in the universal file format;

an electronic commerce (EC) control procedures 132 that perform various processing functions pertaining to the receipt and transmission of the transmission files; and other data and procedures.

Referring to FIG. 2, there is shown a block diagram of the client computer 102 in the distributed computer system 100 that is associated with a trading partner. The client computer comprises an accounting data processing system 202 and an electronic commerce processing system 204. The electronic commerce processing system 204 can include a central processing unit (CPU) 222, a memory 220, a user interface 224, and a communications interface 226 for communication with the network server 108 and the accounting data processing system 202.

The primary memory 220 of the electronic commerce processing system 204 can be used to store the following:

an operating system 228;

network access procedures 230;

an encryption procedure 232 that is used to encrypt and decrypt incoming and outgoing transmission files, additionally the encryption procedure can be utilized to compress and decompress these files;

an electronic commerce (EC) control procedure 234 that manages the processing of the electronic commerce processing system 204;

a transaction database 236 that stores one or more transactions in the universal file format;

a trading partner database 238 that lists those trading partners authorize to communicate with this particular trading partner;

a transaction approval database 240 that stores information pertaining to the requirements for approving certain types of transactions;

a viewing template repository 242 that stores one or more viewing templates for use in displaying the transactions in the transaction database;

a repository of outgoing transmission files 244; and a repository of incoming transmission files 246.

The accounting data processing system 202 comprises a CPU 248, a user interface 250, a memory 205 and a communications interface 252 for communication with the electronic commerce processing system 204. In the memory of the accounting data processing system 202, there can be stored the following:

an operating system 206;

a conversion file 208 that is used to translate data from the accounting database format to the universal file format and which is specific to the particular accounting database;

an accounting database 210;

a conversion procedure 212 for converting data from the accounting database format to the universal file format and which utilizes a socket table 214 in the conversion;

one or more output data files 216, each output data file stores transaction-type data extracted from the accounting database 210 pertaining to a specified type of transaction;

one or more input data files 218 containing data received from one or more trading partners, each input file containing data pertaining to a specified transaction type;

an accounting database procedure 219 that manages the operation of the accounting data processing system 202; and other files and processing modules.

Referring to FIG. 3, there is shown a block diagram of the bank client computer in the distributed computer system 100. The bank client computer comprises a banking interface processing system 302 and a bank data processing system 304. The bank interface processing system 302 can include a central processing unit (CPU) 332, a memory 312, a user interface 334, and a communications interface 336 for communication with the network server 108 and the bank data processing system 304.

The primary memory 312 of the bank client computer can be used to store the following:

an operating system 314;

network access procedures 316;

a translation procedure 318 that converts transactions stored in the universal file format to an appropriate ACH format;

an encryption procedure 320 that is used to encrypt and decrypt incoming and outgoing transmission files, additionally the encryption procedure can be utilized to compress and decompress these files;

a transaction approval database 322 that stores information pertaining to the requirements for approving certain types of transactions;

a repository of incoming transmission files 324;

a repository of outgoing transmission files 326;

a transaction database 328 that stores one or more transactions in the universal file format;

an electronic commerce control procedure 330 for managing the operations of the banking interface processing system 302; and other files and processing modules.

The universal file format is unique in that it is not constrained to a specific set of data elements nor to a particular format. Rather, the format accommodates any type of data element and in any order. The format includes standard elements that are common to most accounting database systems as well as user-defined data elements that are specific to a particular accounting database system. In addition, the order of the elements is flexible and can be defined by the particular accounting application. As such, the universal file format is flexible and extensible enough to accommodate accounting data from any type of accounting database system. The universal file format serves as a basis for the electronic commerce system in supporting the exchange of EDI and EFT type transactions between trading partners and banking institutions that utilize incompatible systems.

Figure 4A:
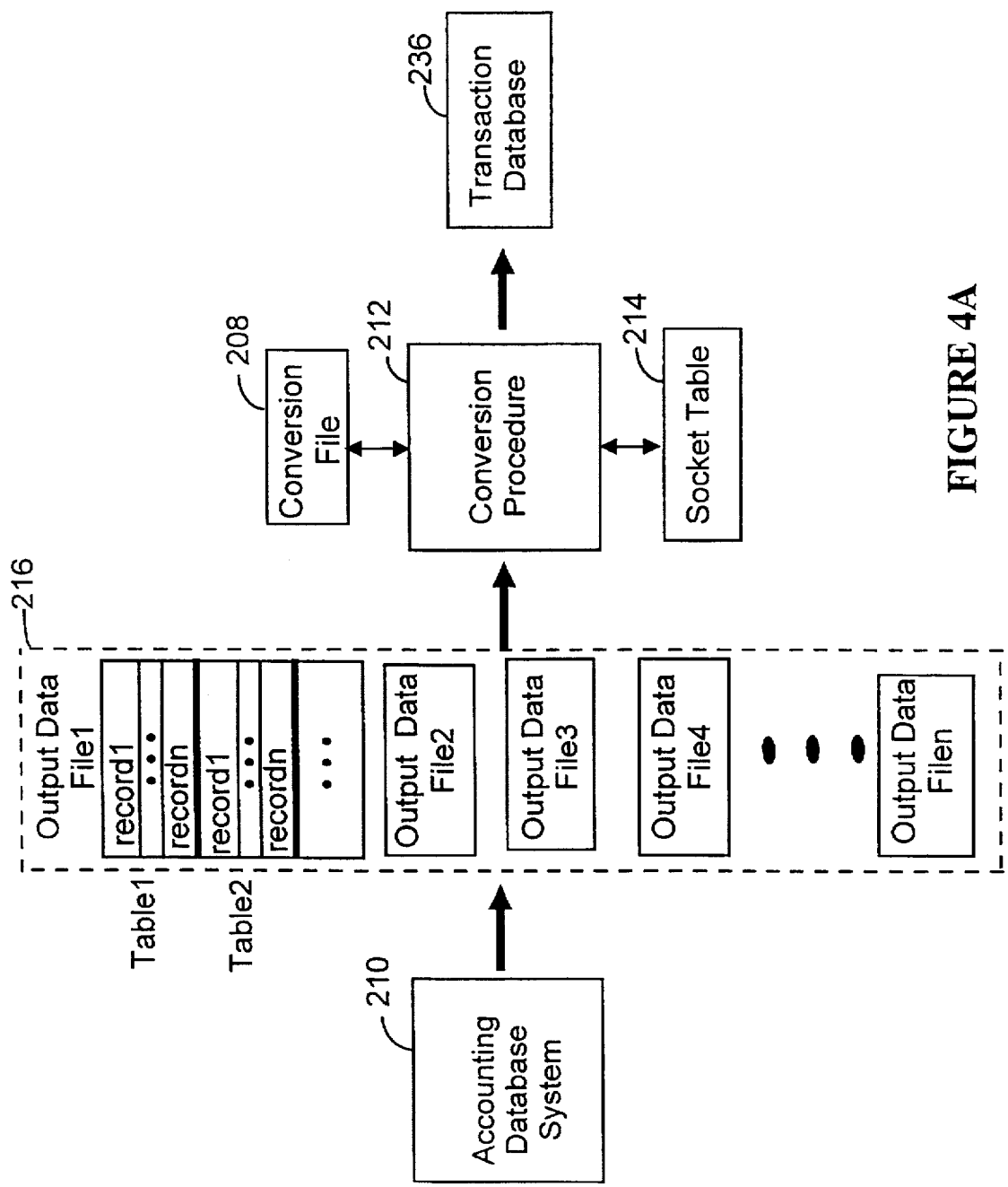
FIGS. 4A–B are flow charts illustrating the steps used in the conversion procedure in a preferred embodiment of the present invention.

FIG. 4A illustrates the process of converting accounting data into the universal file format. Each accounting data processing system 202 has an accounting database system 210. Accounting database systems are well known in the art and can utilize relational and relational-like database storage systems and/or hierarchical file storage systems. The preferred embodiment is not limited to any particular type of accounting database system and is flexible enough to support any type.

The accounting database system 210 interacts with the electronic commerce processing system 204 through one or more output files 216. This is done partly for security reasons in order to restrict access to the accounting database 210 which contains highly confidential data. The output files 216 contain data representing business or financial transactions that are to be transmitted to a trading partner. The accounting database procedure 219 writes the data to the output files 216 which are then converted and stored in a socket table 214 incorporating the universal file format. The output files 216 can utilize most database formats. Often the file format of the accounting database system 210 is used since it requires minimal processing by the accounting data processing system 202.

The output files 216 are structured in accordance with a prescribed classification such that each file 216 contains data pertaining to a particular type of transaction. In the preferred embodiment, there are eleven different output files and they are classified as shown in Appendix 1. However, the present invention is not constrained to this particular classification scheme and others can be utilized.

Each output file 216 contains one or more tables that are made up of records containing standard and user-defined data elements. A data element is the basic unit of a transaction and it represents a singular fact, e.g., price, quantity, name, or description. A standard data element is one that adheres to a prescribed classification defined by the electronic commerce system 100 and a user-defined data element is one that is specific to a particular accounting data processing system 202. In addition, each table of an output file differs. Some tables are used to store master or header information and others are used to store detail information. The tables are also categorized into mandatory and optional tables. Appendix 1 lists the types of tables contained in each output file and Appendix 2 illustrates the standard data elements.

For example, a payment order output data file can consist of two distinct data tables: a payment order table and a remittance advice table. The payment order table is a header table that contains data representing EFT payment related information. The remittance advice table is a detail table that represents invoices paid by the EFT payments. The payment order table is mandatory since it contains data that is required for the payment to be cleared through a bank. The remittance advice table is optional since the data contained in it is not needed by the bank in order to settle the payment. The standard elements contained in both tables are listed in Appendix 2.

Referring back to FIG. 4A, the conversion procedure 212 reads each output data file 216 and translates the data elements to the universal file format which will be described below. A conversion file 208 is used by the conversion procedure 212 to read the tables and records contained in each output data file 216. Since the format of the output data files 216 for each accounting data processing system 202 varies, there is typically a different conversion file 208 associated with each accounting data processing system 202.

The converted data is temporarily stored in a socket table 214. Upon completion of the conversion procedure 212, the records in the socket table 214 are then transmitted to the electronic commerce processing system 204 and stored in the transaction database 236.

Figure 4B:
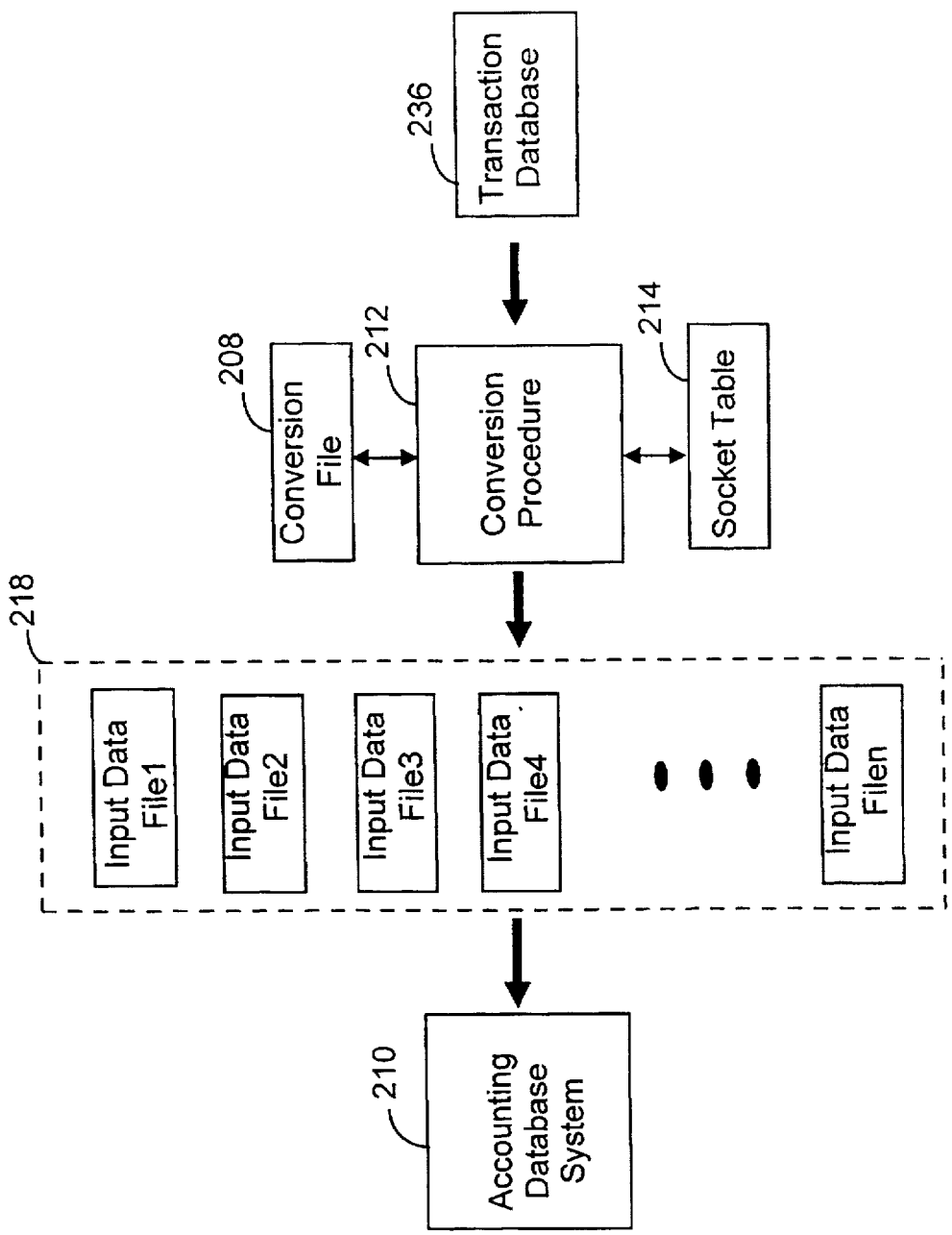

FIGS. 4B illustrates the process of converting received transactions incorporating the universal file format into the file format of the receiving accounting data processing system 202. One or more incoming transmission files from the network server 108 are received. Each file contains data records in the universal format which will be described below. These records are incorporated into the transaction database 236. Upon an end user's approval, one or more of the received records are exported to the accounting data processing system 202. The conversion procedure 212 reads these transactions and converts them into one or more input data files 218. The input data files 218 are classified in accordance to transaction type using the same classification scheme utilized for the output data files 216. The input data files 218 have a file format that is similar to the format of the accounting database 210. The conversion procedure 212 uses a conversion file 208 to output the received data into the input data files 218 in accordance with the appropriate file format. The accounting database system 210 periodically reads the input data files 218 and performs updating as required.

FIGS. 5A–5G illustrate the universal file format that is utilized by the socket table 214, the transaction databases 130, 236, 328 and the incoming and outgoing transmission files 124, 126, 244, 246, 324, 326. Any file utilizing this format is an ASCII file composed of a definition section 502 and a data section 504. The definition section 502 contains definition records that are used to define data elements and an order for reading their values. The definition section 502 contains at least one document master definition record 505, one or more header table definition records 506, and one or more detail data definition records 507. The document master definition record 505 identifies the sender of the file as well as other general information. Preferably, there is one document master definition record 505 for each transmitted file. A header table definition record 506 identifies the data elements contained in a particular header table and the detail data definition record 507 identifies the data elements contained in a particular detail table (see Appendix 1).

The data section 504 contains data records 508, 509, 510 including data elements defined in the corresponding definition records in the definition section 502. There is a document master data record 508 corresponding to the document master definition record 505, a header table data record 509 corresponding to a header table definition record 506, and a detail data record 510 corresponding to a detail data definition record 507.

Figure 5A:
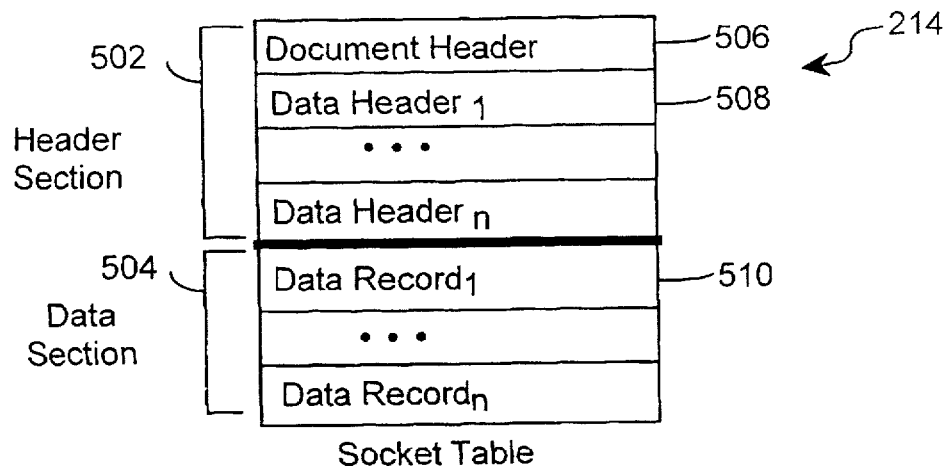
Figure 5B:
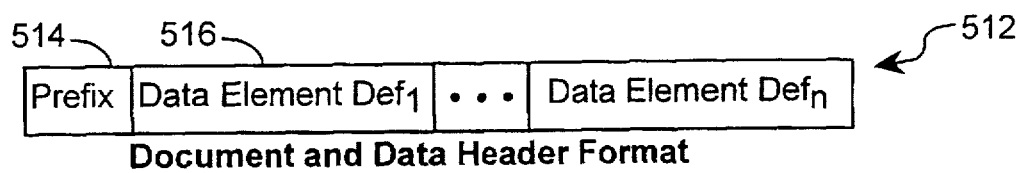

Each definition record 505, 506, 507 contains a prefix 514 and one or more data element definitions 516 that define data elements stored in the data section 504 (see FIG. 5B). The order in which the data element definitions 516 are listed in a definition record 505, 506, 507 is the order in which the data elements appear in the data section 504.

The format of each definition record 505, 506, 507 is shown in FIG. 5B. Each of these records contains a prefix 514 followed by one or more data element definitions 516. The prefix for a document master definition record 514a follows the format shown in FIG. 5E and contains the letters "DOCMST" in between angle brackets. The prefix for the header table and detail data definition record 514b is enclosed in angle brackets and contains an identifier 529, a related table indicator 530, a first element number field 531, and a second element number field 532. For the header table definition record 506, the identifier 529 is an output data file identifier followed by the letter "H." For the detail data definition record 507, the identifier 529 identifies a corresponding table in the output data file followed by the letter "D." The related table indicator 530 contains a single character indicating whether a related table is included in the file. Preferably, the character "Y" indicates an affirmative response and the character "N" indicates a negative response. The first element number field 531 indicates an alternate relational element number for the corresponding table and the second element number field 532 indicates an alternate relational element number for a related table.

Figure 5C:
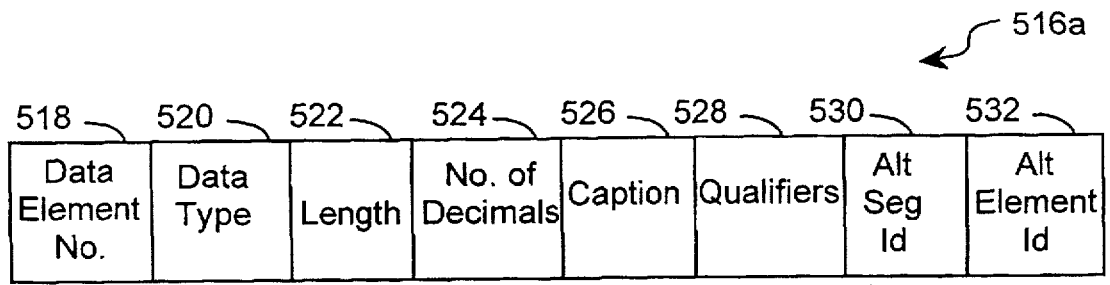
Figure 5D:
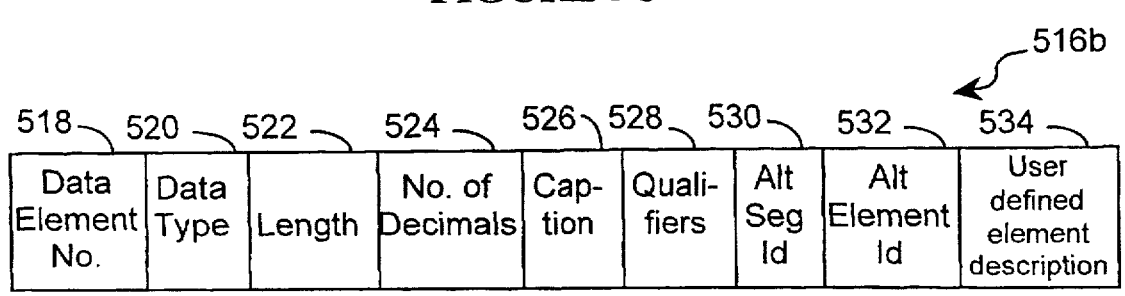
Figure 5E:
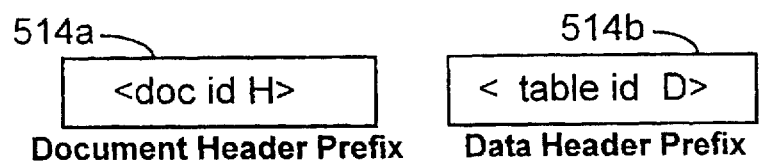

Each definition record 505, 506, 507 specifies one or more data element definitions 516. There are two types of data element definitions: one for standard data elements 516a; and another for user-defined data elements 516b. A standard data element definition corresponds to a standard data element (see Appendix 2). A user-defined data element definition corresponds to a user-defined data element used by the particular accounting data processing system. The format for both of these data element definitions 516 is shown in FIGS. 5C and 5D.

A data element definition for a user-defined data element 516b contains the same fields that are used to describe a data element definition for a standard data element 516a except for one additional field. For this reason, the fields common to both formats will be discussed first. Referring to FIG. 5D, a data element definition 516 contains a data element number 518. For a standard data element 516a, this number is within the range of 10000–89999 and adheres to the conventions listed in Appendix 2. For a user-defined data element 516b, the data element number 518 is within the range of 90000–99999. The data type 520 for each data element are alphabetic characters that can consist of the values shown in Appendix 3.

The length field 522 defines the length of a particular data element. However, each data element's size is constrained to the limits specified in Appendix 4. The precision field 524 is used for numeric data elements. It specifies the number of digits to the right of the decimal point. For example, a length.precision field of 8.1 can be used for the numeric value 999999.9 and 5.0 defines the length of the numeric value 99999.

The caption field 526 is a string of characters that can be used as a column heading on a screen or report for the corresponding data element. Qualifiers 528 are used to define the coded values associated with a data element. For example, a data element for "Shipping Method" exists in an accounting system and the shipping methods are expressed as alphanumeric codes where the value "1" represents UPS, the value "2" represents US Postal Service, and the value "3" represents Federal Express. In this case, the qualifiers would take the following format:

{"1"; "UPS"; "2"; "US Postal Service"; "3"; "Federal Express"}.

The above format of the qualifiers contains one or more qualifiers separated by semicolons and uses braces as start and end delimiters. The qualifier code is listed first followed by the value represented by the qualifier code.

The user-defined data element field 534 is used for user-defined data elements and this field describes the user-defined element as well as how the data element is to be interpreted.

Figure 5F:
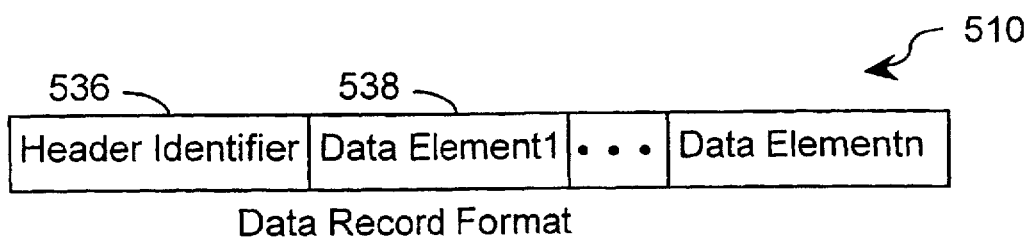

Each of the records in the data section 504 utilize a common format that is shown in FIG. 5F. The first field is a header identifier 536 that specifies the prefix of the corresponding definition record. The next fields contain values for each data element 538 specified in the associated definition record. Each data element is separated by a semicolon and positioned in the same sequence as defined in the associated definition record. If a data element defined in a data record is not available, a semicolon placeholder is put in the position where the data element should have been.

FIG. 5G illustrates an exemplary transmission file incorporating the universal file format. Lines 1–13 represent the definition section and lines 14–27 represent the data section. Line 1 is the document master definition record, lines 2–3 and 8–9 represent detail data definition records, lines 4–7 and 10–13 represent header table definition records. Line 14 represents the document master data record, lines 15–17, 19–22 represent header table data records, and lines 18, 23–27 represent detail data records.

In this example, the document master definition record is represented in line 1 and begins with a square bracket and ends with a square bracket. The document header record prefix "DOCMST" is enclosed between angle brackets (<>). The data element definitions in the document header record are separated by an upright character ("I"). Data definition fields are separated by a semicolon. A semicolon is also used as a placeholder for missing attributes. The document header record is terminated by a newline (i.e., carriage return and line feed).

The first data element definition in the document master definition record is "10007;D;8; ; ; ". The data element number 10007 refers to an EC socket file data (see Appendix 1), the data type is "D" or date (see Appendix 3), and the length of the field is eight bytes long. The remaining fields are empty and as such are replaced with semicolons. The corresponding data element is located in line 14 which in this example is "19960807" or Aug. 7, 1996. The remaining data element definitions in the document master definition record as well as the header table and detail data definition records are interpreted in the same manner.

Lines 4–7 represent a header table definition record for a purchase order table. This definition record is easily distinguishable since the last character of the prefix is an "H". This definition record defines data elements that are located in lines 19–22. Lines 2–3 represent a detail data definition record containing line item detail data elements associated with the purchase order table. The detail data definition record is also easily distinguishable since the last character of the prefix is an "D." The data elements defined in this detail data definition record are located in lines 23–27.

Lines 8–9 depict a detail data definition record for an electronic fund payment order. This particular definition record contains a user-defined data element which is the last data element definition in this record. "90002;C;35; ; ; "Promotion Description." This definition identifies the data element number 90002 with a 35-byte character string describing a promotion. The associated data element is found as the last data element in line 18 which is "August Buyer Promotion."

Figure 6:
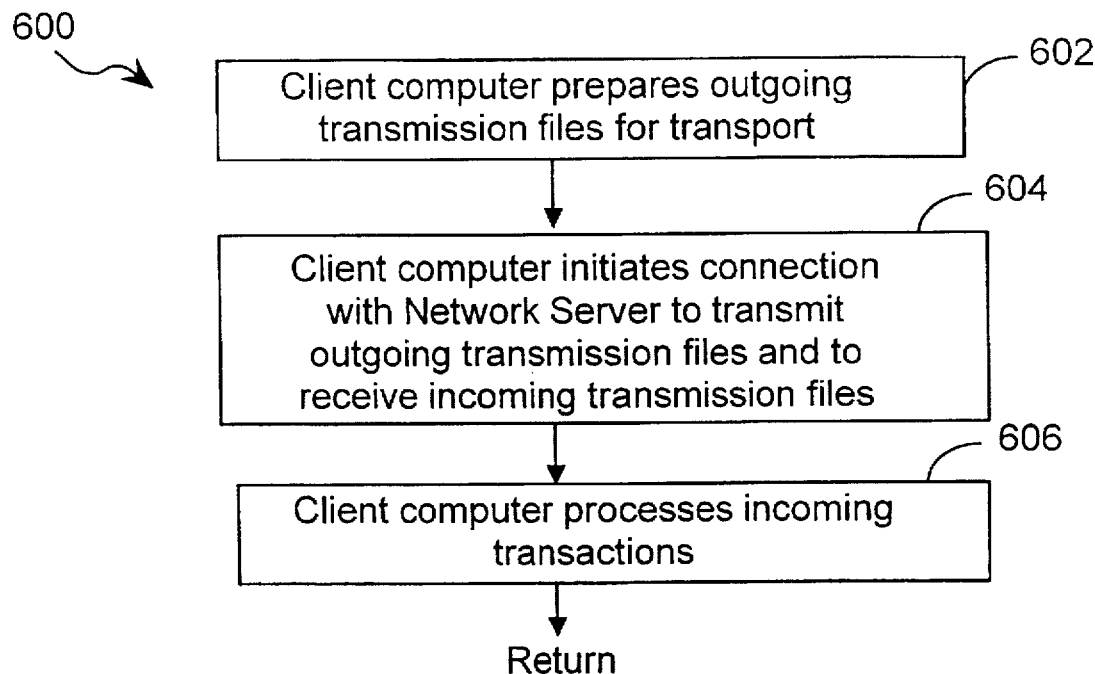
FIG. 6 is a flow chart illustrating the steps used by a client computer to transmit data in a preferred embodiment of the present invention.

FIG. 6 illustrates the processing steps used by a client computer 102 in a preferred embodiment of the present invention. Preferably, a trading partner client computer transmits and receives data from the various trading partners whereas a banking client computer typically receives data. Initially, the trading partner client computer prepares one or more outgoing transmission files 236 containing transactions for transmission to one or more trading partners (step 602). All transmissions between client computers 102 are routed through the network server 108. In order to receive or transmit data from the network server 108, the client computer 102 activates a connection with the network server 108. Once this connection is activated, the network server 108 will transmit to the client computer 102 one or more incoming transmission files 246 (step 604). The client computer 102 then processes the received transactions in the incoming transmission files 246 (step 606).

Figure 8:
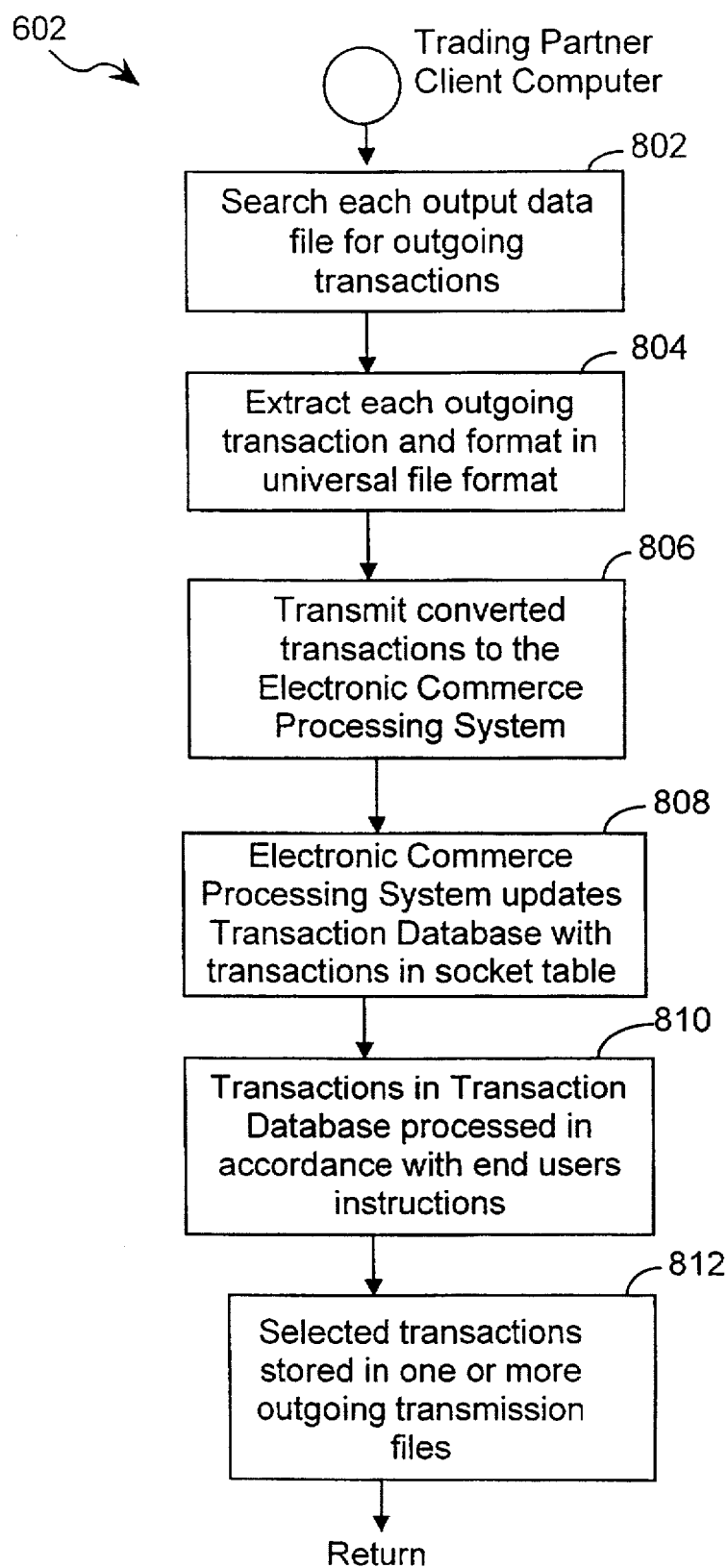
FIG. 8 is a flow chart illustrating the steps used by a trading partner client computer to prepare an outgoing transmission file in a preferred embodiment of the present invention.

FIG. 8 illustrates the steps used by a trading partner client computer in preparing an outgoing transmission file 244. The output data files 216 are loaded with data representing transactions slated for transmission to one or more trading partners. The conversion procedure 212 reads each output data file 216 and selects those data records slated for transmission (step 802). Preferably, a data record will have a status field with a code set for transmission. Data records with this code in their status field are selected by the conversion procedure 212. The data elements in each of these data records are translated into a socket table 214 incorporating the universal file format as was previously described above with reference to FIGS. 4A and 5A–5H (step 804). The status field of each data record that is converted in then set to another code indicating that the conversion process was performed.

The records in the socket table 214 are then transmitted to the electronic commerce processing system 204 (step 806). These records are stored in the transaction database 236 (step 808). Next, the transactions can be processed by one or more end users associated with the accounting data processing system 202 (step 810). An end user can view the transactions on a display device or other type of user interface 224. A viewing template 242 is used to decipher the data stored in the universal file format into a presentable display format. The end user can view the transactions and perform a number of processing operations (step 810).

For example, one or more transactions may require approval by one or more end users. A particular transaction may have several approval requirements such as the number of required approvals and the approving party. Likewise, an end user may be authorized to approve certain transactions based on a specified dollar amount, within a certain time period, and for a certain number of transactions. Approval requirement information for each transaction type and approval authority information for each end user associated with a particular electronic commerce processing system 204 are stored in the transactions approval database 240. The electronic commerce control procedure 234 enables one or more end users to perform the necessary approvals in accordance with the requirements set forth in the transactions approval database 240.

Figure 10:
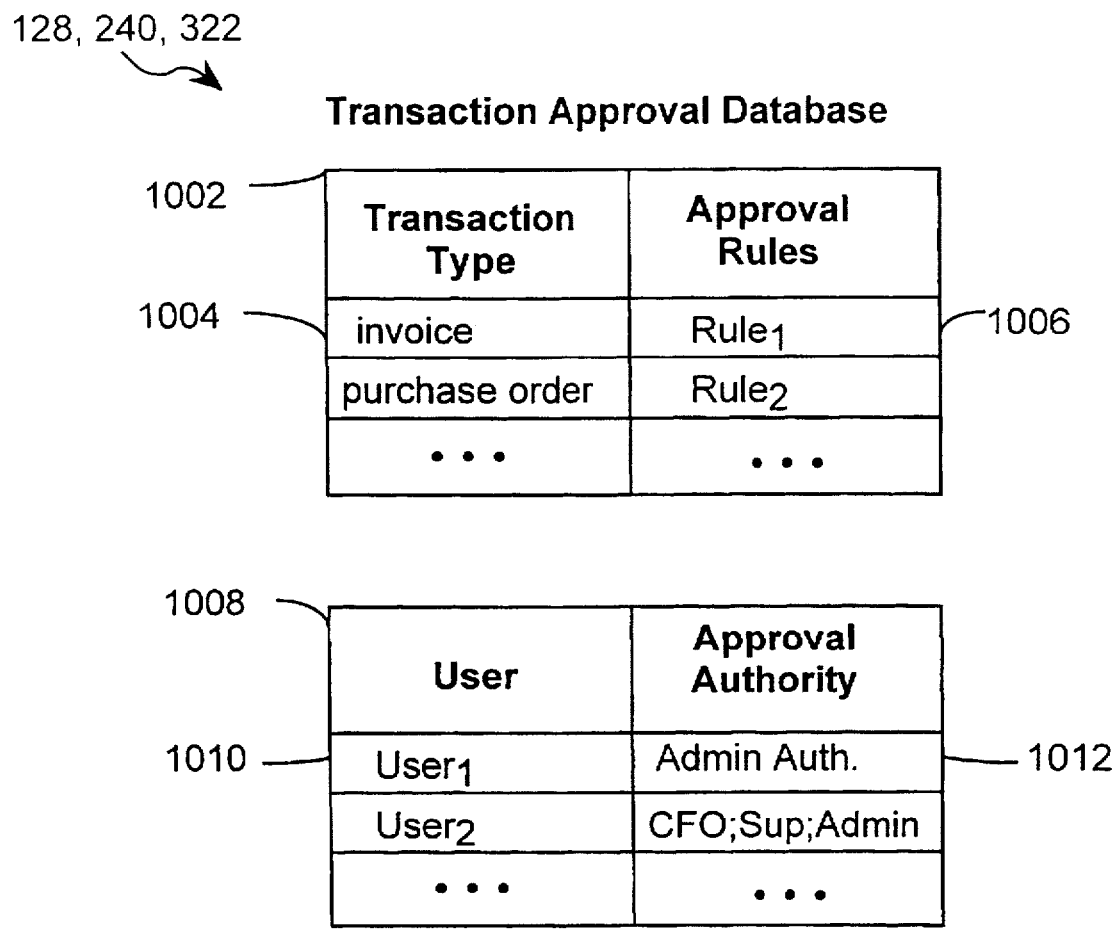
FIG. 10 illustrates an exemplary file layout of the transaction approval database.

FIG. 10 illustrates an exemplary format of the transaction approval databases 128, 240, 322 that reside in the network server 108 and in each client computer 102. Although the contents of the data in each of the transaction approval databases may differ, a common structure is used. The transaction approval databases are preferably relational databases containing a rule table 1002 and a user table 1008. The rule table 1002 contains one or more approval rules 1004 that are associated with a particular type of transaction 1006 and a corresponding amount 1008.

The user table 1008 lists one or more end users 1010 and their respective approval authority 1012. The approval authority 1012 lists one or more rules contained in the rule table 1002 that specify the type of transaction and amount that a particular user 1010 is authorized to approve.

For example, approval rule, pertains to invoices for amounts less than $1000. $User_1$ has the approval authority associated with $rule_1$ which in this case is for invoices less than $1000.

In addition, an end user can elect to hold certain transactions from transmission until a later point. Other transactions can be flagged for transmission. In addition, an end user can also elect to send viewing templates 242 associated with its transaction database 236 to one or more trading partners. The viewing templates 242 are sent in order for the end user associated with the receiving trading partner to view the transaction in a format desired by the sending trading partner.

Once the end user has completed its processing, the flagged transmissions are collated into one or more outgoing transmission files 244 (step 812). Preferably, the files are compressed and/or encrypted before they are transmitted due to the highly confidential nature of the data contained in the transaction. Any of the well known encryption and/or compression methods can be employed. The end user then activates a connection with the electronic commerce network 106 and the outgoing transmission files 244 are transmitted to the network server 108. At this time, the network server 108 transmits to the client computer one or more incoming transmission files 246.

Figure 9:
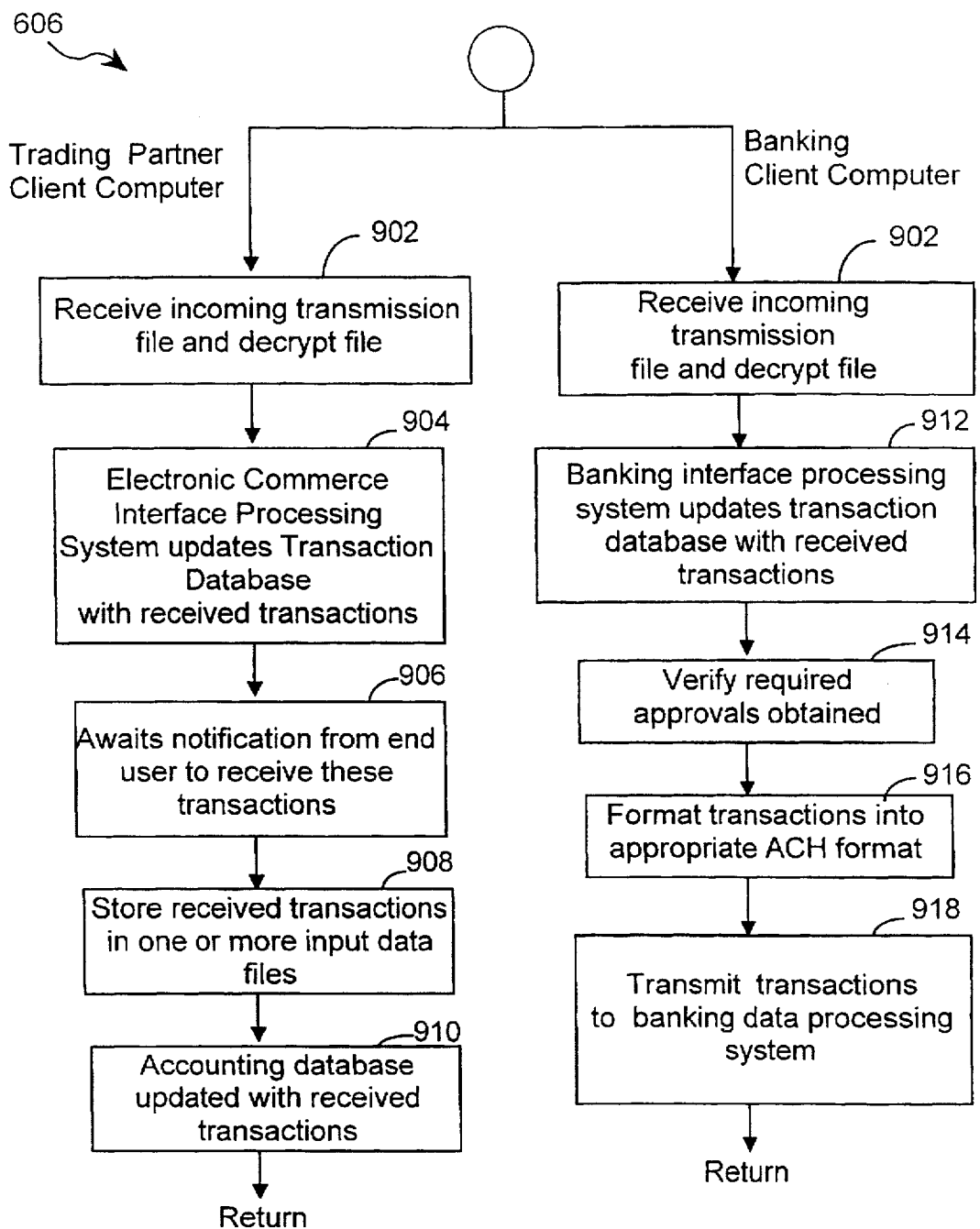
FIG. 9 is a flow chart illustrating the steps used by a client computer in receiving one or more incoming transmission files in a preferred embodiment of the present invention.

FIG. 9 is a flow chart illustrating the steps used by the client computer in processing incoming transactions. When the client computer receives an incoming transmission file 246, the file is decrypted and decompressed (step 902). A trading partner client computer then updates the transaction database 236 with the transactions in the incoming transmission files 246 (step 904). One or more end users associated with the particular accounting data processing system 202 can review the transactions and process them in a desired manner. The end user can then flag those transactions that are to be exported (step 906). The electronic commerce processing system 204 then exports received transactions to the accounting data processing system 202 which converts using the conversion procedure 212 from the universal file format into one or more input data files 218 as was previously described above with reference to FIG. 4B (step 908). The accounting database system 210 is then updated with the incoming data (step 910).

A banking client computer typically receives electronic payments/electronic funds transfers. After the incoming transmission files have been decrypted (step 902), the transactions are stored in the transaction database 328 (step 912). The banking interface processing system 302 then verifies that each transaction has obtained the correct approvals (step 914). A transaction approval database 322 stores approval requirement information for each trading partner associated with the particular banking client computer. If the transaction does not meet the approval requirements, the transaction is flagged as being in error. This error can be viewed by the banking end user on a display device 334. The banking end user can override the error flag if so desired.

Alternatively, an error report can be produced after all the received transactions have been processed indicating those transactions failing to meet the approval requirements and the like.

Next, the transactions are then converted to an appropriate ACH format by the translation procedure 318 (step 916). The ACH format is a well-known data standard used by the banking industry. The transactions are then transmitted to the bank data processing system 304 (step 918). Typically, the bank data processing system 304 receives the electronic payment authorization and begins the settlement process utilizing an external banking network 306 to complete the process.

Figure 7:
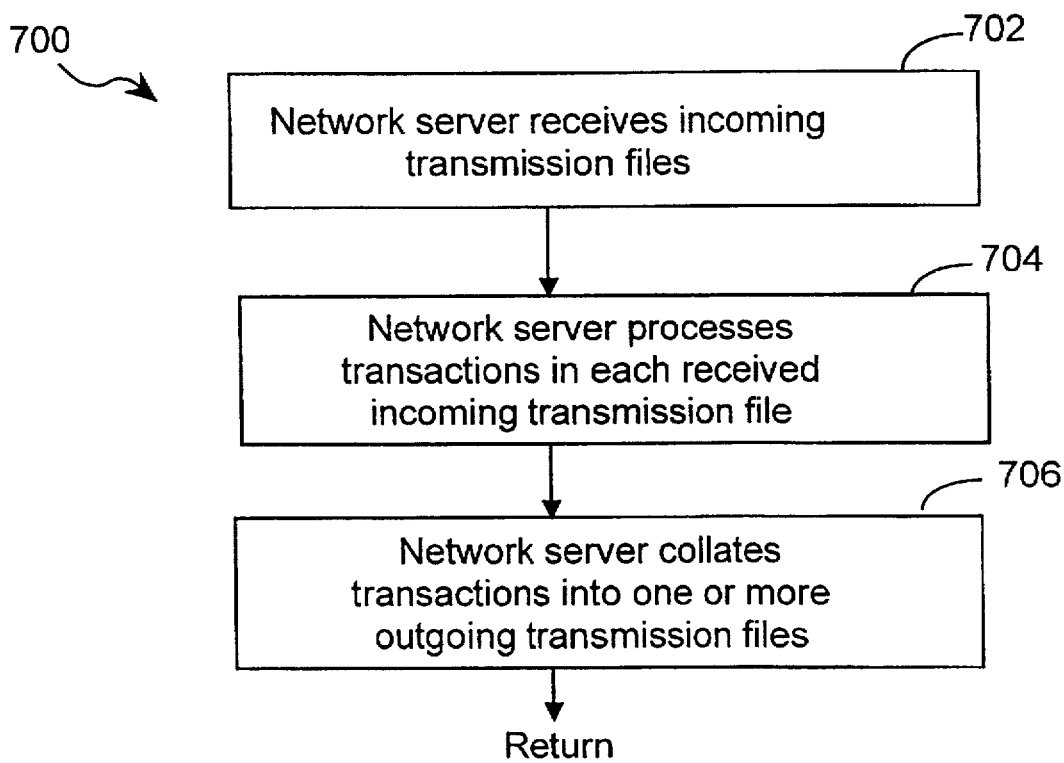
FIG. 7 is a flow chart illustrating the steps used by the network server in a preferred embodiment of the present invention.

FIG. 7 is a flow chart illustrating the steps used by the network server 108 in handling the transmission of data between the client computers 102. Each client computer 102 transmits to the network server 108 one or more transmission files which the network server 108 receives, decrypts, and decompresses (step 702). Next, the network server 108 performs various processing operations on the received transactions (step 704). For those transactions requiring approval, the network server 108 checks if the correct approvals have been obtained. The transaction approval database 128 stored in the network server 108 lists the appropriate approval requirements for each particular trading partner. If a transaction has not obtained the required approval requirements, the transaction is returned to the originating client computer 102. The network server 108 can also post each transaction in its transaction database 130 in order to perform tracking operations or reporting information. The network server 108 is constructed to perform one or more value added services that one or more of the client computers 102 may desire.

Next, the network server 108 collates the transactions into one or more outgoing transmission files 126 destined for an appropriate client computer 102 (step 706). Electronic payment/electronic funds transfers are also routed to the respective banking client computer. Each of the files is compressed, encrypted, and stored in the outgoing transmission file repository 126 until the particular destination client computer 102 requests transmission of the files.

The aforementioned method and system describes an electronic commerce distributed system that integrates in an automated manner the exchange of EDI and EFT type transactions between client computers representing various trading partners and banking institutions utilizing incompatible data processing systems. In addition, the electronic commerce system performs additional value added services for the client computers. The basis of the electronic commerce system is a universal file format that enables the exchange of data stored in incompatible databases with minimal intervention by the accounting application. The universal file format is robust accommodating any type of data element and is not constrained to any particular data sequence.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, it should be noted that the present invention is not limited to a distributed computer system. It may be practiced without the specific details and may be implemented in various computer systems and in various configurations, or makes or models of tightly-coupled processors or in various configurations of loosely-coupled microprocessor systems.

Further, the electronic commerce system described herein above is not constrained to the transmission of EDI and EFT type transactions. The system can incorporate the transmission of other types of electronic data such as but not limited to electronic mail and the like.

The conversion procedure need not be executed in the accounting data processing system. In alternate embodiments, the conversion procedure, conversion file, and the associated input and output data files can be stored in the electronic commerce data processing system and executed therein.

Although the present invention is described with respect to an accounting data processing system, others types of business applications systems can be employed in lieu of an accounting data processing system.

In addition, the present invention is not constrained to one network server. Multiple network servers can be utilized with each network server configured to handle the exchange of data between various arrangements of client computers and/or network servers.

This disclosure presents the preferred format for the prefix and data element definition fields that comprise the header and data records. However, the present invention is not constrained to this format and others may be used that achieve the same purpose.

Further, the method and system described hereinabove is amenable for execution on various types of executable mediums other than a memory device such as a random access memory. Other types of executable mediums can be used, such as but not limited to, a computer readable storage medium that can be any memory device, compact disc, or floppy disk.

| | Output File Classification | Tables |
|---|---|---|
| Output File$_1$ | Invoice | Billing Invoice Header |
| | | Billing Invoice Line Item Detail |
| Output File$_2$ | Payment Order/ Remittance Advice | Payment Order |
| | | Remittance Advice |
| Output File$_3$ | Contract Award | Contract Award Header |
| | | Contract Award Line Item Detail |
| Output File$_4$ | Request for Quotation | Quotation Header |
| | | Quotation Line Item Header |
| Output File$_5$ | Response to Request for Quotation | Quotation Response Header |
| | | Quotation Response Line Item Detail |
| Output File$_6$ | Purchase Order | Purchase Order Header |
| | | Purchase Order Line Item Detail |
| Output File$_7$ | Purchase Order Acknowledgment | PO Acknowledgment Header |
| | | PO Acknowledgment Line Item Detail |
| Output File$_8$ | Shipping Notice/ Manifest | Ship Notice/Manifest Header |
| | | Ship Notice/Manifest Load Detail |
| Output File$_9$ | Shipment and Billing Notice | Ship and Bill Notice Header |
| | | Ship and Bill Notice Line Item Detail |
| Output File$_{10}$ | Purchase Order Change Request | PO Change Request Header |
| | | PO Change Request Line Item Detail |
| Output File$_{11}$ | Purchase Order Charge Acknowledgment/ Request | PO Charge Ack/Request Header |
| | | PO Charge Ack/Request Line Item Detail |

Appendix 1

APPENDIX 2

Standard Data Elements

Page 1

| Data Elem Numbr | Data Element Description | Data Type | Length | Prec |
|---|---|---|---|---|
| 10000 | Transaction Reference Number | C | 254 | 0 |
| 10001 | Originating Application Software Table (NT Source) | C | 254 | 0 |
| 10002 | Application Software TP Code (NT Code) | C | 254 | 0 |
| 10003 | Transaction Date | D | 8 | 0 |
| 10004 | Transaction Amount | N | 14 | 2 |
| 10005 | Sender EC ID | C | 6 | 0 |
| 10006 | EC Socket File Version | C | 5 | 0 |
| 10007 | EC Socket File Date | D | 8 | 0 |
| 10008 | EC Socket File Time | T | 6 | 0 |
| 10009 | Transaction Stamp | C | 12 | 0 |
| 10102 | Recipient Network ID | C | 6 | 0 |
| 10104 | Sender S.I.C. Code | C | 4 | 0 |
| 10106 | Geographic Location ID | C | 254 | 0 |
| 10108 | Entity Identifier | C | 254 | 0 |
| 10109 | EDI Conversion Required? | L | 1 | 0 |
| 10110 | Division Identifier | C | 254 | 0 |
| 10111 | Target EDI Version/Release for Conversion | C | 254 | 0 |
| 10112 | Group Identifier | C | 254 | 0 |
| 10113 | Record Sequence Number | N | 14 | 2 |
| 10119 | Alternate Field Delimiter | C | 254 | 0 |
| 10120 | Alternate Record Delimiter | C | 254 | 0 |
| 10121 | Originating Application Software Company Identifier | C | 254 | 0 |
| 10122 | Originating Application Company Name | C | 254 | 0 |
| 10123 | Originating Application Version | C | 254 | 0 |
| 10124 | Originating Application Model | C | 254 | 0 |
| 10125 | Originating Application Module | C | 254 | 0 |
| 10126 | Originating Application Build | C | 254 | 0 |
| 10127 | Test Transmission? | L | 1 | 0 |
| 10128 | X12 Version | C | 6 | 0 |
| 10129 | X12 Industry Implementation Convention | C | 6 | 0 |
| 10130 | X12 Segment Separator | C | 2 | 0 |
| 10131 | X12 Element Separator | C | 1 | 0 |
| 10132 | X12 Subelement Separator | C | 1 | 0 |
| 10200 | Salesperson Name | C | 254 | 0 |
| 10201 | Salesperson Code | C | 254 | 0 |
| 10221 | Blanket Order Number | C | 254 | 0 |
| 10223 | Blanket Order Date | D | 8 | 0 |
| 10225 | Blanket Order Complete? | L | 1 | 0 |
| 10227 | Blanket Order Status | C | 254 | 0 |
| 10228 | Work Order Number | C | 254 | 0 |
| 10229 | Drop Shipment Reference | C | 254 | 0 |
| 10241 | Remittance Type | C | 254 | 0 |
| 10242 | Remittance Required Data | C | 254 | 0 |
| 10243 | Remittance Editing Required? | L | 1 | 0 |
| 10244 | Remittance Editing Mask | C | 254 | 0 |
| 10245 | Remittance Exception Option | C | 254 | 0 |
| 10246 | Remittance Prevalidation Required? | L | 1 | 0 |
| 10247 | Remittance Prevalidation Wait Business Days | C | 254 | 0 |
| 10248 | Remittance Format Delivery Option | C | 254 | 0 |
| 10249 | Remittance Posting Cut-off | T | 6 | 0 |
| 10261 | Invoice Type | C | 254 | 0 |
| 10262 | Invoice Payment Priority | C | 254 | 0 |
| 10263 | Invoice Method | C | 254 | 0 |

Standard Data Elements

Page 2

| Data Elem Numbr | Data Element Description | Data Type | Length | Prec |
|---|---|---|---|---|
| 10264 | Invoice Format | C | 254 | 0 |
| 10265 | Invoice Detail Level | C | 254 | 0 |
| 10266 | Invoice Undeliverable Option | C | 254 | 0 |
| 10267 | Invoice Undeliverable Destination | C | 254 | 0 |
| 10281 | Amount of 1099 Payment | N | 14 | 2 |
| 10282 | Vendor 1099 Type | C | 254 | 0 |
| 10302 | Comment | M | 2000 | 0 |
| 10402 | Buyer | C | 254 | 0 |
| 10403 | Buyer Code | C | 254 | 0 |
| 10404 | Code Identifying Type of Source Document | C | 254 | 0 |
| 10407 | Contract Number | C | 254 | 0 |
| 10408 | Customer Reference | C | 254 | 0 |
| 10409 | Customer Type | C | 254 | 0 |
| 10410 | Data Entry ID | C | 254 | 0 |
| 10411 | Department Number | C | 254 | 0 |
| 10412 | Entity Status | C | 254 | 0 |
| 10413 | Extended Amount | N | 14 | 2 |
| 10415 | Freight Carrier | C | 254 | 0 |
| 10416 | Freight Charges | N | 14 | 2 |
| 10417 | Inventory Substitution Allowed? | L | 1 | 0 |
| 10418 | Invoice Status | C | 254 | 0 |
| 10419 | Item Control Account | C | 254 | 0 |
| 10420 | Line of Business Description | C | 254 | 0 |
| 10421 | Misc Charge Amount | N | 14 | 2 |
| 10422 | Misc Charge Description | C | 254 | 0 |
| 10423 | Open Order? | L | 1 | 0 |
| 10424 | Payee's Packing List Number | C | 254 | 0 |
| 10425 | Payment Format Option | C | 254 | 0 |
| 10426 | Payment System Code | C | 254 | 0 |
| 10427 | Payment Type | C | 254 | 0 |
| 10428 | PO Status | C | 254 | 0 |
| 10429 | Pricing Scheme | C | 254 | 0 |
| 10430 | Quantity Released To Date | N | 14 | 2 |
| 10431 | Recipient Payment Schedule Number | C | 254 | 0 |
| 10432 | Reissue / Duplicate | C | 254 | 0 |
| 10433 | Blanket Order Release Amount | N | 14 | 2 |
| 10434 | Requisition Number | C | 254 | 0 |
| 10435 | Ship via | C | 254 | 0 |
| 10436 | Shipment Method of Payment | C | 254 | 0 |
| 10437 | Inventory Location ID | C | 254 | 0 |
| 10438 | Taxable Total | N | 14 | 2 |
| 10439 | Territory | C | 254 | 0 |
| 10440 | Type of Invoice | C | 254 | 0 |
| 10441 | Vendor Type | C | 254 | 0 |
| 10442 | Ship To Warehouse Location | C | 254 | 0 |
| 11101 | Amount of Adjustment on Invoice | N | 14 | 2 |
| 11102 | Adjustment Reason Code 1 | C | 254 | 0 |
| 11103 | Adjustment Reason Code 2 | C | 254 | 0 |
| 11121 | Monetary Amount Qualifier Code | C | 254 | 0 |
| 11122 | Total Monetary Amount of Line Item | N | 14 | 2 |
| 11142 | PO Type Code | C | 254 | 0 |
| 11143 | Purchase Order Number | C | 254 | 0 |
| 11144 | PO Date | D | 8 | 0 |

Standard Data Elements

Page 3

| Data Elem Numbr | Data Element Description | Data Type | Length | Prec |
|---|---|---|---|---|
| 11145 | Acknowledgment Type | C | 254 | 0 |
| 11161 | Acknowledgment Date | C | 254 | 0 |
| 11162 | Subject Description | C | 254 | 0 |
| 11181 | Transaction Handling Code | C | 254 | 0 |
| 11182 | Total Dollar Amount of All Transactions in EC Socket File | N | 14 | 2 |
| 11183 | Amount of Payment | N | 14 | 2 |
| 11184 | Credit/Debit Flag Code | C | 254 | 0 |
| 11185 | Payment Method Code | C | 254 | 0 |
| 11186 | Payment Format (CCD, CTX, etc.) | C | 254 | 0 |
| 11190 | Sender DUNS Number | C | 9 | 0 |
| 11194 | Effective Entry Date | D | 8 | 0 |
| 11195 | Payment Date | D | 8 | 0 |
| 11197 | Business Function Code | C | 254 | 0 |
| 11223 | Profile Date | D | 8 | 0 |
| 11224 | Profile Time | T | 6 | 0 |
| 11225 | Profile Transaction Type Code | C | 254 | 0 |
| 11226 | Profile Transaction Purpose Code | C | 254 | 0 |
| 11227 | Cancellation, Change, Renewal Reference Number | C | 254 | 0 |
| 11228 | Cancellation, Change, Renewal Ref No Date | D | 8 | 0 |
| 11229 | Cancellation, Change, Renewal Ref No Time | T | 6 | 0 |
| 11241 | Shipment Requirement Code or Description | C | 254 | 0 |
| 11242 | Do Not Exceed Action Code or Description | C | 254 | 0 |
| 11243 | Do Not Exceed Amount | N | 14 | 2 |
| 11261 | Sender Currency Code | C | 254 | 0 |
| 11262 | Recipient Currency Code | C | 254 | 0 |
| 11263 | Exchange Rate | N | 14 | 2 |
| 11264 | Exchange Code | C | 254 | 0 |
| 11265 | Foreign Exchange Used As Basis for Exchange Rate | C | 254 | 0 |
| 11266 | Effective Date of Exchange Rate | D | 8 | 0 |
| 11269 | Effective Time of Exchange Rate | T | 6 | 0 |
| 11281 | Discount Terms Type Code | C | 254 | 0 |
| 11282 | Discount Unit of Measure | C | 254 | 0 |
| 11283 | Discount Base Value | N | 14 | 2 |
| 11284 | Discount Control Limit Qualifier | C | 254 | 0 |
| 11285 | Lower Discount Control Limit | N | 14 | 2 |
| 11286 | Upper Discount Control Limit | N | 14 | 2 |
| 11287 | Discount Amount | N | 14 | 2 |
| 11301 | First Schedule Delivery Date | D | 8 | 0 |
| 11302 | First Schedule Ship Date | D | 8 | 0 |
| 11303 | Contract Completion Date | D | 8 | 0 |
| 11304 | Contract Start Date | D | 8 | 0 |
| 11305 | Date of Invoice, Adjustment, Debit Memo, or Credit | D | 8 | 0 |
| 11306 | Date of the Adjustment not yet recorded | D | 8 | 0 |
| 11307 | Date/Time Qualifier | D | 8 | 0 |
| 11308 | Do Not Deliver Before Date | D | 8 | 0 |
| 11309 | Do Not Deliver After Date | D | 8 | 0 |
| 11310 | Effective Date of Change | D | 8 | 0 |
| 11311 | End Date | D | 8 | 0 |
| 11314 | Order Start Date | D | 8 | 0 |
| 11315 | Order End Date | D | 8 | 0 |
| 11316 | Requested for Deliver Date | D | 8 | 0 |
| 11317 | Required Delivery Date | D | 6 | 0 |
| 11318 | Service Period Start Date | D | 8 | 0 |

Standard Data Elements

Page 4

| Data Elem Numbr | Data Element Description | Data Type | Length | Prec |
|---|---|---|---|---|
| 11319 | Service Period End Date | D | 8 | 0 |
| 11320 | Do Not Ship Before Date | D | 8 | 0 |
| 11321 | Start Date | D | 8 | 0 |
| 11322 | Submittal Date | D | 8 | 0 |
| 11323 | Required Date | D | 8 | 0 |
| 11401 | EDI Communications Environment Code | C | 254 | 0 |
| 11402 | EDI Communications Environment Number Qualifier | C | 254 | 0 |
| 11403 | EDI Communications Environment Communication Number | C | 254 | 0 |
| 11421 | Payee's AR Account Reference | C | 254 | 0 |
| 11422 | Amount of Federal Tax | N | 14 | 2 |
| 11441 | FOB Shipment Method of Payment | C | 254 | 0 |
| 11442 | FOB Shipment Location Qualifier | C | 254 | 0 |
| 11443 | FOB Point | C | 254 | 0 |
| 11444 | FOB Related Instructions | C | 254 | 0 |
| 11461 | Total Number of Included Transaction Sets | N | 14 | 2 |
| 11487 | Responsible Agency Code | C | 254 | 0 |
| 11541 | Sales Requirement Code or Description | C | 254 | 0 |
| 11551 | Terms Basis Date Code | D | 8 | 0 |
| 11552 | Discount Rate/Percent | N | 14 | 2 |
| 11553 | Terms Discount Due Date | D | 8 | 0 |
| 11554 | Terms Discount Days Due | N | 14 | 2 |
| 11555 | Terms Net Due Date | D | 8 | 0 |
| 11556 | Terms Net Days | N | 14 | 2 |
| 11557 | Terms Discount Amount | N | 14 | 2 |
| 11558 | Terms Deferred Due Date | D | 8 | 0 |
| 11559 | Deferred Amount Due | N | 14 | 2 |
| 11560 | Term Net Days to Pay | N | 14 | 2 |
| 11561 | Invoice Discount Date | D | 8 | 0 |
| 11562 | Invoice Percentage of Discount | N | 14 | 2 |
| 11563 | Invoice Due Date | D | 8 | 0 |
| 11565 | Term Payment Discount Days | N | 14 | 2 |
| 11566 | Term Payment Discount Percent | N | 14 | 2 |
| 11567 | Sales Discount Percent | N | 14 | 2 |
| 11568 | Payment Terms | C | 254 | 0 |
| 11569 | Invoice Amount on Which Discount Is Allowed | N | 14 | 2 |
| 11570 | Terms Net Payment Discount Percentage | N | 14 | 2 |
| 11573 | Percent of Invoice Payable | N | 14 | 2 |
| 11581 | Organizational Type Assigned Identification | C | 254 | 0 |
| 11582 | Organizational Type Entity Identifier Code | C | 254 | 0 |
| 11583 | Organizational Country Identifier Code | C | 254 | 0 |
| 11584 | Organizational Locale of Incorporation ID Code | C | 254 | 0 |
| 11601 | Lead Time Code/Description | C | 254 | 0 |
| 11602 | Quantity of Lead Time | N | 14 | 2 |
| 11603 | Lead Unit of Time Period Code | C | 254 | 0 |
| 11604 | Lead Special Event Date | D | 8 | 0 |
| 11621 | Assigned Number | N | 14 | 2 |
| 11641 | Marks and Numbers Qualifier | C | 254 | 0 |
| 11642 | Marks and Numbers | C | 254 | 0 |
| 11661 | Warranty Period | C | 254 | 0 |
| 11681 | Special Instructions/Text Message | M | 2000 | 0 |
| 11701 | Alternate/Sub-vendor Company Name | C | 254 | 0 |
| 11702 | Alternate/Sub-vendor Contact Name | C | 254 | 0 |
| 11703 | Alternate/Sub-vendor Contact Title | C | 254 | 0 |

Page 5

Standard Data Elements

| Data Elem Numbr | Data Element Description | Data Type | Length | Prec |
|---|---|---|---|---|
| 11704 | Alternate/Sub-vendor Address Line 1 | C | 254 | 0 |
| 11705 | Alternate/Sub-vendor Address Line 2 | C | 254 | 0 |
| 11706 | Alternate/Sub-vendor Address Line 3 | C | 254 | 0 |
| 11707 | Alternate/Sub-vendor Address Line 4 | C | 254 | 0 |
| 11708 | Alternate/Sub-vendor Address Line 5 | C | 254 | 0 |
| 11709 | Alternate/Sub-vendor City | C | 254 | 0 |
| 11710 | Alternate/Sub-vendor State/Province | C | 254 | 0 |
| 11711 | Alternate/Sub-vendor Postal Code | C | 254 | 0 |
| 11712 | Alternate/Sub-vendor Country | C | 254 | 0 |
| 11713 | Alternate/Sub-vendor Address Type | C | 254 | 0 |
| 11714 | Alternate/Sub-vendor DUNS Number | C | 254 | 0 |
| 11715 | Alternate/Sub-vendor Phone No. 1 | C | 254 | 0 |
| 11716 | Alternate/Sub-vendor Phone No. 2 | C | 254 | 0 |
| 11717 | Alternate/Sub-vendor Fax Number | C | 254 | 0 |
| 11735 | Recipient EIN Number | C | 254 | 0 |
| 11739 | Recipient Email Address | C | 254 | 0 |
| 11741 | Sender Company Name | C | 254 | 0 |
| 11742 | Sender Contact Name | C | 254 | 0 |
| 11743 | Sender Address Line 1 | C | 254 | 0 |
| 11744 | Sender Address Line 2 | C | 254 | 0 |
| 11745 | Sender Address Line 3 | C | 254 | 0 |
| 11746 | Sender Address Line 4 | C | 254 | 0 |
| 11747 | Sender Address Line 5 | C | 254 | 0 |
| 11748 | Sender City | C | 254 | 0 |
| 11749 | Sender State/Province | C | 254 | 0 |
| 11750 | Sender Postal Code | C | 254 | 0 |
| 11751 | Sender Country | C | 254 | 0 |
| 11752 | Sender Address Type | C | 254 | 0 |
| 11754 | Sender EIN | C | 9 | 0 |
| 11755 | Sender Fax Number | C | 254 | 0 |
| 11756 | Sender Email Address | C | 254 | 0 |
| 11757 | Sender Phone No. 1 | C | 254 | 0 |
| 11758 | Sender Phone No. 2 | C | 254 | 0 |
| 11759 | Sender Contact Title | C | 254 | 0 |
| 11761 | Line Item Targeted Entity Identifier Code | C | 254 | 0 |
| 11762 | Line Item Targeted Company Name | C | 254 | 0 |
| 11763 | Line Item Targeted Contact Name | C | 254 | 0 |
| 11764 | Line Item Targeted Contact Title | C | 254 | 0 |
| 11765 | Line Item Targeted Address Line 1 | C | 254 | 0 |
| 11766 | Line Item Targeted Address Line 2 | C | 254 | 0 |
| 11767 | Line Item Targeted City | C | 254 | 0 |
| 11768 | Line Item Targeted State/Province | C | 254 | 0 |
| 11769 | Line Item Targeted Postal Code | C | 254 | 0 |
| 11770 | Line Item Targeted Country | C | 254 | 0 |
| 11771 | Line Item Targeted Person to Contact Phone Number | C | 254 | 0 |
| 11772 | Line Item Targeted Person to Contact Fax Number | C | 254 | 0 |
| 11773 | Line Item Targeted Person to Contact Email Number | C | 254 | 0 |
| 11775 | Line Item Targeted Person to Contact | C | 254 | 0 |
| 11776 | Line Item Targeted Person to Contact Code | C | 254 | 0 |
| 11781 | Bill To Company Name | C | 254 | 0 |
| 11782 | Bill To Contact Name | C | 254 | 0 |
| 11783 | Bill To Contact Title | C | 254 | 0 |
| 11784 | Bill To Address Line 1 | C | 254 | 0 |

Standard Data Elements

Page 6

| Data Elem Numbr | Data Element Description | Data Type | Length | Prec |
|---|---|---|---|---|
| 11785 | Bill To Address Line 2 | C | 254 | 0 |
| 11786 | Bill To Address Line 3 | C | 254 | 0 |
| 11787 | Bill To Address Line 4 | C | 254 | 0 |
| 11788 | Bill To Address Line 5 | C | 254 | 0 |
| 11789 | Bill To City | C | 254 | 0 |
| 11790 | Bill To State/Province | C | 254 | 0 |
| 11791 | Bill To Postal Code | C | 254 | 0 |
| 11792 | Bill To Country | C | 254 | 0 |
| 11793 | Bill To DUNS Number | C | 254 | 0 |
| 11794 | Bill To Address Type | C | 254 | 0 |
| 11795 | Bill To Phone No. 1 | C | 254 | 0 |
| 11796 | Bill To Phone No. 2 | C | 254 | 0 |
| 11797 | Bill To Fax Number | C | 254 | 0 |
| 11861 | Paperwork Contact Name | C | 254 | 0 |
| 11862 | Paperwork Contact Title | C | 254 | 0 |
| 11863 | Paperwork Address Line 1 | C | 254 | 0 |
| 11864 | Paperwork Address Line 2 | C | 254 | 0 |
| 11865 | Paperwork Address Line 3 | C | 254 | 0 |
| 11866 | Paperwork Address Line 4 | C | 254 | 0 |
| 11867 | Paperwork Address Line 5 | C | 254 | 0 |
| 11868 | Paperwork City | C | 254 | 0 |
| 11869 | Paperwork State/Province | C | 254 | 0 |
| 11870 | Paperwork Postal Code | C | 254 | 0 |
| 11871 | Paperwork Country | C | 254 | 0 |
| 11881 | Ship To Code | C | 254 | 0 |
| 11882 | Ship To Company Name | C | 254 | 0 |
| 11883 | Ship To Contact Name | C | 254 | 0 |
| 11884 | Ship To Contact Title | C | 254 | 0 |
| 11885 | Ship To Address Line 1 | C | 254 | 0 |
| 11886 | Ship To Address Line 2 | C | 254 | 0 |
| 11887 | Ship To Address Line 3 | C | 254 | 0 |
| 11888 | Ship To Address Line 4 | C | 254 | 0 |
| 11889 | Ship To Address Line 5 | C | 254 | 0 |
| 11890 | Ship To City | C | 254 | 0 |
| 11892 | Ship To Postal Code | C | 254 | 0 |
| 11893 | Ship To Country | C | 254 | 0 |
| 11894 | Ship To DUNS Number | C | 254 | 0 |
| 11895 | Ship To Address Type | C | 254 | 0 |
| 11896 | Ship To Phone No. 1 | C | 254 | 0 |
| 11897 | Ship To State/Province | C | 254 | 0 |
| 11898 | Ship To Fax Number | C | 254 | 0 |
| 11899 | Ship To Phone No. 2 | C | 254 | 0 |
| 11921 | Recipient Company Name | C | 254 | 0 |
| 11922 | Recipient Contact Name | C | 254 | 0 |
| 11923 | Recipient Contact Title | C | 254 | 0 |
| 11924 | Recipient Address Line 1 | C | 254 | 0 |
| 11925 | Recipient Address Line 2 | C | 254 | 0 |
| 11926 | Recipient Address Line 3 | C | 254 | 0 |
| 11927 | Recipient Address Line 4 | C | 254 | 0 |
| 11928 | Recipient Address Line 5 | C | 254 | 0 |
| 11929 | Recipient City | C | 254 | 0 |
| 11930 | Recipient State/Province | C | 254 | 0 |
| 11931 | Recipient Postal Code | C | 254 | 0 |

Standard Data Elements

Page 7

| Data Elem Numbr | Data Element Description | Data Type | Length | Prec |
|---|---|---|---|---|
| 11932 | Recipient Country | C | 254 | 0 |
| 11933 | Recipient DUNS Number | C | 254 | 0 |
| 11934 | Recipient Entity Identifier Code | C | 254 | 0 |
| 11936 | Recipient Address Type | C | 254 | 0 |
| 11937 | Recipient Phone No. 1 | C | 254 | 0 |
| 11938 | Recipient Phone No. 2 | C | 254 | 0 |
| 11939 | Recipient Fax Number | C | 254 | 0 |
| 11961 | VAN Entity Identifier Code | C | 254 | 0 |
| 11962 | VAN Company Name | C | 254 | 0 |
| 11963 | VAN Contact Name | C | 254 | 0 |
| 11964 | VAN Contact Title | C | 254 | 0 |
| 11965 | VAN Address Line 1 | C | 254 | 0 |
| 11966 | VAN Address Line 2 | C | 254 | 0 |
| 11967 | VAN Address Line 3 | C | 254 | 0 |
| 11968 | VAN Address Line 4 | C | 254 | 0 |
| 11969 | VAN Address Line 5 | C | 254 | 0 |
| 11970 | VAN City | C | 254 | 0 |
| 11971 | VAN State/Province | C | 254 | 0 |
| 11972 | VAN Postal Code | C | 254 | 0 |
| 11973 | VAN Country | C | 254 | 0 |
| 11974 | VAN Address Type | C | 254 | 0 |
| 11975 | VAN Phone No. 1 | C | 254 | 0 |
| 11976 | VAN Phone No. 2 | C | 254 | 0 |
| 11977 | VAN Fax Number | C | 254 | 0 |
| 12001 | Entity Type | C | 254 | 0 |
| 12002 | Legal Name | C | 254 | 0 |
| 12004 | Short Name | C | 254 | 0 |
| 12014 | Type of Address | C | 254 | 0 |
| 12015 | Identifier Code Qualifier | C | 254 | 0 |
| 12017 | Identification Code Qualifier for DUNS Number | C | 254 | 0 |
| 12018 | Line Item Targeted DUNS Number | C | 254 | 0 |
| 12101 | Reference Number Qualifier | C | 254 | 0 |
| 12103 | VAN Reference Number Qualifier | C | 254 | 0 |
| 12104 | Reference Number | M | 2000 | 0 |
| 12105 | Request Reference Number | C | 254 | 0 |
| 12106 | VAN Reference Number | C | 254 | 0 |
| 12121 | Notes/Special Instructions in free form | C | 254 | 0 |
| 12141 | Average Number of Employees Qualifier | C | 254 | 0 |
| 12143 | Average Number of Employees Unit of Measure | C | 254 | 0 |
| 12144 | Average Annual Revenue Qualifier | C | 254 | 0 |
| 12161 | Person to Contact Code | C | 254 | 0 |
| 12162 | Type of Contact | C | 254 | 0 |
| 12163 | Person to Contact | C | 254 | 0 |
| 12164 | Person Communication Number Qualifier | C | 254 | 0 |
| 12165 | Type of Contact Number | C | 254 | 0 |
| 12166 | Person to Contact Phone Number | C | 254 | 0 |
| 12167 | Person to Contact Fax Number | C | 254 | 0 |
| 12168 | Person to Contact Email Number | C | 254 | 0 |
| 12169 | Person to Contact Defense Switched Net Number | C | 254 | 0 |
| 12170 | Contact Number | C | 254 | 0 |
| 12191 | Item Description Type | C | 254 | 0 |
| 12192 | Packaging Characteristic Code | C | 254 | 0 |
| 12193 | Agency Code Qualifier for Packing, Marking, Loading | C | 254 | 0 |

Page 8

Standard Data Elements

| Data Elem Numbr | Data Element Description | Data Type | Length | Prec |
|---|---|---|---|---|
| 12194 | Packaging Description | C | 254 | 0 |
| 12195 | Marking of Package Description | C | 254 | 0 |
| 12196 | Loading/Unloading Description | C | 254 | 0 |
| 12221 | Action Code | C | 254 | 0 |
| 12222 | Action Entity Identifier Code | C | 254 | 0 |
| 12223 | Action Date | D | 8 | 0 |
| 12224 | Action Time | T | 6 | 0 |
| 12241 | Item Number | C | 254 | 0 |
| 12242 | Quantity Ordered | N | 14 | 2 |
| 12243 | Unit of Measure | C | 254 | 0 |
| 12244 | Unit Price of Seller | N | 14 | 2 |
| 12245 | Vendor Part Number | C | 254 | 0 |
| 12247 | Item & Product Description | C | 254 | 0 |
| 12248 | Product Code | C | 254 | 0 |
| 12249 | Commodity Grouping | C | 254 | 0 |
| 12250 | Country of Origin | C | 254 | 0 |
| 12251 | Color | C | 254 | 0 |
| 12252 | End Item Description | C | 254 | 0 |
| 12253 | Next Higher Used Assembly | C | 254 | 0 |
| 12254 | Engineering Data List | C | 254 | 0 |
| 12255 | Lot Number | C | 254 | 0 |
| 12256 | Manufacturer | C | 254 | 0 |
| 12257 | Manufacturer's Part Number | C | 254 | 0 |
| 12258 | Model Number | C | 254 | 0 |
| 12259 | Military Specification Number | C | 254 | 0 |
| 12260 | Serial Number | C | 254 | 0 |
| 12261 | Substitute Product Number | C | 254 | 0 |
| 12262 | Size of Ordered Item | C | 254 | 0 |
| 12263 | Shipping Container Code | C | 254 | 0 |
| 12264 | Alternate Unit Price | N | 14 | 2 |
| 12265 | Alternate Quantity | N | 14 | 2 |
| 12266 | Alternate Unit of Measure | C | 254 | 0 |
| 12267 | Pack | N | 14 | 2 |
| 12268 | Gross Weight per Pack | N | 14 | 2 |
| 12269 | Gross Volume per Pack | N | 14 | 2 |
| 12270 | Length of Item | N | 14 | 2 |
| 12271 | Width of Item | N | 14 | 2 |
| 12272 | Height of Item | N | 14 | 2 |
| 12273 | Unit of Measure Factor | N | 14 | 2 |
| 12401 | Paperwork Report Type Code | C | 254 | 0 |
| 12402 | Paperwork Transmission Code | C | 254 | 0 |
| 12403 | Paperwork Copies Needed | N | 14 | 2 |
| 12404 | Paperwork Entity Identifier Code | C | 254 | 0 |
| 12405 | Paperwork Report Action Code | C | 254 | 0 |
| 12421 | Line Item Targeted Reference Number Qualifier | C | 254 | 0 |
| 12423 | Bill of Lading Number | C | 254 | 0 |
| 12424 | Line Item Targeted Reference Numbers | M | 2000 | 0 |
| 12426 | Invoice Reference | C | 254 | 0 |
| 12428 | Batch Control Number | C | 254 | 0 |
| 12441 | Payee's Invoice/Source Document Number Qualifier | C | 254 | 0 |
| 12442 | Code Indicating How Payee Is to Apply Payment | C | 254 | 0 |
| 12444 | Invoice Amount before Discounts and Adjustment | N | 14 | 2 |
| 12445 | Total Invoice Dollar Amount of Discount Taken | N | 14 | 2 |

Standard Data Elements

Page 9

| Data Elem Numbr | Data Element Description | Data Type | Length | Prec |
|---|---|---|---|---|
| 12461 | Service, Promotion, Allowance or Charge Indicator | C | 254 | 0 |
| 12462 | Service, Promotion, Allowance or Charge Code | C | 254 | 0 |
| 12463 | Service, Promotion, Allowance or Charge Amount | N | 14 | 2 |
| 12464 | Service, Promotion, Allowance or Charge Unit of Measure Code | C | 254 | 0 |
| 12465 | Service, Promotion, Allowance or Charge Quantity | N | 14 | 2 |
| 12481 | Partial Delivery Quantity | N | 14 | 2 |
| 12482 | Partial Quantity Unit of Measure | C | 254 | 0 |
| 12483 | Partial Quantity Ship Not Before Date | D | 8 | 0 |
| 12484 | Partial Quantity Do Not Deliver After Date | D | 8 | 0 |
| 12485 | Partial Quantity Do Not Deliver Before Date | D | 8 | 0 |
| 12486 | Partial Quantity first Schedule Delivery Date | D | 8 | 0 |
| 12487 | Partial Quantity 1st Schedule Ship Date | D | 8 | 0 |
| 12488 | Partial Quantity Requested for Deliver Date | D | 8 | 0 |
| 12489 | Partial Quantity Required Delivery Date | D | 8 | 0 |
| 12501 | Multiple Location Destination Unit of Measure | C | 254 | 0 |
| 12502 | Multiple Location Destination ID Code Qualifier | C | 254 | 0 |
| 12503 | Multiple Location Identification Code | C | 254 | 0 |
| 12504 | Multiple Location Quantity | N | 14 | 2 |
| 12524 | Transaction Purpose Code | C | 254 | 0 |
| 12542 | Function Group Response Header | C | 254 | 0 |
| 12543 | Function Group Response Trailer | C | 254 | 0 |
| 12561 | Special Handling/Hazardous Material Code | C | 254 | 0 |
| 12562 | Hazardous Material Description | C | 254 | 0 |
| 12563 | Carrier Identification Code Qualifier | C | 254 | 0 |
| 12564 | Carrier Identification Code | C | 254 | 0 |
| 12565 | Transportation/Freight Information | C | 254 | 0 |
| 12566 | Carrier Transportation Method or Type Code | C | 254 | 0 |
| 12581 | Trading Partner Detail Item Description Type | C | 254 | 0 |
| 12582 | Trading Partner Detail Qualifier | C | 254 | 0 |
| 12584 | Trading Partner Detail Description | C | 254 | 0 |
| 12621 | Amount of Sales Tax | N | 14 | 2 |
| 12622 | Amount of State Tax | N | 14 | 2 |
| 12623 | Amount of Local Tax | N | 14 | 2 |
| 12624 | Sales Tax Rate | N | 14 | 2 |
| 12625 | Percent State Tax | N | 14 | 2 |
| 12626 | Percent Local Tax | N | 14 | 2 |
| 12627 | VAT Tax Code | C | 254 | 0 |
| 12628 | State Tax Jurisdiction Code | C | 254 | 0 |
| 12629 | Local Tax Jurisdiction Code | C | 254 | 0 |
| 12630 | VAT Jurisdiction Code | C | 254 | 0 |
| 12632 | Invoice Amount Subject To Sales Tax | N | 14 | 2 |
| 12635 | Invoice Amount Subject To VAT | N | 14 | 2 |
| 12636 | EDI Transaction Capabilities Action Code | C | 254 | 0 |
| 12637 | EDI Transaction Standard Used | C | 254 | 0 |
| 12638 | EDI Transaction Sets/Documents to Be Used | C | 254 | 0 |
| 12639 | EDI Standards Version and Release ID Code | C | 254 | 0 |
| 12642 | Time Registration Action to Be Taken | T | 6 | 0 |
| 12643 | Sales Tax District | C | 254 | 0 |
| 12644 | Tax Rate | N | 14 | 2 |
| 12645 | Tax Amount | N | 14 | 2 |
| 12646 | Sales Tax Territory | C | 254 | 0 |
| 12647 | Tax Identification Number | C | 254 | 0 |
| 12648 | Tax Table | C | 254 | 0 |

Standard Data Elements

Page 10

| Data Elem Numbr | Data Element Description | Data Type | Length | Prec |
|---|---|---|---|---|
| 12649 | State Tax Table | C | 254 | 0 |
| 12650 | Sales Tax Exempt | C | 254 | 0 |
| 12651 | Sender Tax ID | C | 254 | 0 |
| 12653 | Sales Tax Amount | N | 14 | 2 |
| 12654 | Local Tax Table | C | 254 | 0 |
| 12655 | Exempt From Sales Tax? | L | 1 | 0 |
| 12656 | Amount Subject To Federal Tax | N | 14 | 2 |
| 12657 | Amount Subject To State Tax | N | 14 | 2 |
| 12658 | Amount Subject To Local Tax | N | 14 | 2 |
| 12659 | Sales Tax Certificate | C | 254 | 0 |
| 12660 | Tax Certificate Effective Date | D | 8 | 0 |
| 12661 | Tax Certificiate Expiration Date | D | 8 | 0 |
| 12662 | Tax Certificate Memo | C | 254 | 0 |
| 12663 | Tax Certificate Name | C | 254 | 0 |
| 12664 | Tax Certificate Number | C | 254 | 0 |
| 12665 | Tax Certificate State | C | 254 | 0 |
| 12666 | Tax Exempt Code | C | 254 | 0 |
| 12667 | Amount of Sales Tax | N | 14 | 2 |
| 12668 | Amount of VAT | N | 14 | 2 |
| 12669 | Amount Subject To VAT | N | 14 | 2 |
| 12921 | Sender Accounts Receivable Customer Number | C | 254 | 0 |
| 12922 | Invoice Number | C | 254 | 0 |
| 12924 | Paid Amount | N | 14 | 2 |
| 12925 | Balance Amount | N | 14 | 2 |
| 12927 | Order Date | D | 8 | 0 |
| 12928 | Shipment Complete? | L | 1 | 0 |
| 13001 | Item Discount | N | 14 | 2 |
| 13002 | Quantity Shipped | N | 14 | 2 |
| 13003 | Item Cost | N | 14 | 2 |
| 13004 | Item Price | N | 14 | 2 |
| 13005 | Extended Price | N | 14 | 2 |
| 13006 | Suggested Retail Price | N | 14 | 2 |
| 13007 | Invoice Date | D | 8 | 0 |
| 13008 | Inventory Class | C | 254 | 0 |
| 13009 | Product Line | C | 254 | 0 |
| 13010 | Stock Code | C | 254 | 0 |
| 13011 | Invoice type | C | 254 | 0 |
| 13012 | Inventory Status | C | 254 | 0 |
| 13013 | Item Physical Details | C | 254 | 0 |
| 13014 | Tarriff Reference | C | 254 | 0 |
| 13015 | Advertise Schedule Requirements | C | 254 | 0 |
| 13018 | PO Amount | N | 14 | 2 |
| 13019 | Sales Order Number | C | 254 | 0 |
| 13020 | Catalog Number | C | 254 | 0 |
| 13022 | Seller Unit of Measure | C | 254 | 0 |
| 13023 | Blanket Order Release Number | C | 254 | 0 |
| 13024 | Vendor Reference | C | 254 | 0 |
| 13025 | Buyer Phone | C | 254 | 0 |
| 13100 | ODFI Name | C | 254 | 0 |
| 13101 | ODFI Contact Name | C | 254 | 0 |
| 13102 | ODFI Contact Title | C | 254 | 0 |
| 13103 | ODFI Address Line 1 | C | 254 | 0 |
| 13104 | ODFI Address Line 2 | C | 254 | 0 |

Standard Data Elements

Page 11

| Data Elem Numbr | Data Element Description | Data Type | Length | Prec |
|---|---|---|---|---|
| 13105 | ODFI Address Line 3 | C | 254 | 0 |
| 13106 | ODFI Address Line 4 | C | 254 | 0 |
| 13107 | ODFI Address Line 5 | C | 254 | 0 |
| 13108 | ODFI City | C | 254 | 0 |
| 13109 | ODFI State/Province | C | 254 | 0 |
| 13110 | ODFI Postal Code | C | 254 | 0 |
| 13111 | ODFI Country | C | 254 | 0 |
| 13112 | ODFI Address Type | C | 254 | 0 |
| 13113 | ODFI DUNS Number | C | 254 | 0 |
| 13114 | ODFI EIN Number | C | 254 | 0 |
| 13115 | ODFI Phone No. 1 | C | 254 | 0 |
| 13116 | ODFI Phone No. 2 | C | 254 | 0 |
| 13117 | ODFI Fax Number | C | 254 | 0 |
| 13118 | ODFI Email Address | C | 254 | 0 |
| 13130 | RDFI Name | C | 254 | 0 |
| 13131 | RDFI Contact Name | C | 254 | 0 |
| 13132 | RDFI Contact Title | C | 254 | 0 |
| 13133 | RDFI Address Line 1 | C | 254 | 0 |
| 13134 | RDFI Address Line 2 | C | 254 | 0 |
| 13135 | RDFI Address Line 3 | C | 254 | 0 |
| 13136 | RDFI Address Line 4 | C | 254 | 0 |
| 13137 | RDFI Address Line 5 | C | 254 | 0 |
| 13138 | RDFI City | C | 254 | 0 |
| 13139 | RDFI State/Province | C | 254 | 0 |
| 13140 | RDFI Postal Code | C | 254 | 0 |
| 13141 | RDFI Country | C | 254 | 0 |
| 13142 | RDFI Address Type | C | 254 | 0 |
| 13143 | RDFI DUNS Number | C | 254 | 0 |
| 13144 | RDFI EIN Number | C | 254 | 0 |
| 13145 | RDFI Phone No. 1 | C | 254 | 0 |
| 13146 | RDFI Phone No. 2 | C | 254 | 0 |
| 13147 | RDFI Fax Number | C | 254 | 0 |
| 13148 | RDFI Email Address | C | 254 | 0 |
| 13200 | Remit To Name | C | 254 | 0 |
| 13201 | Remit To Contact Name | C | 254 | 0 |
| 13202 | Remit To Contact Title | C | 254 | 0 |
| 13203 | Remit To Address Line 1 | C | 254 | 0 |
| 13204 | Remit To Address Line 2 | C | 254 | 0 |
| 13205 | Remit To Address Line 3 | C | 254 | 0 |
| 13206 | Remit To Address Line 4 | C | 254 | 0 |
| 13207 | Remit To Address Line 5 | C | 254 | 0 |
| 13208 | Remit To City | C | 254 | 0 |
| 13209 | Remit To State/Province | C | 254 | 0 |
| 13210 | Remit To Postal Code | C | 254 | 0 |
| 13211 | Remit To Country | C | 254 | 0 |
| 13212 | Remit To Address Type | C | 254 | 0 |
| 13213 | Remit To DUNS Number | C | 254 | 0 |
| 13214 | Remit To EIN Number | C | 254 | 0 |
| 13215 | Remit To Phone No. 1 | C | 254 | 0 |
| 13216 | Remit To Phone No. 2 | C | 254 | 0 |
| 13217 | Remit To Fax Number | C | 254 | 0 |
| 13218 | Remit To Email Address | C | 254 | 0 |

Data Types

| | |
|---|---|
| Numeric | N |
| Character String | C |
| Date | D |
| Time | T |
| Memo | M |
| Logical | L |

APPENDIX 3

---

Maximum Size of Data Types

| | |
|---|---|
| Numeric | N,16,0-14 |
| Character String | C, 254 bytes |
| Date | C, 8 bytes (YYYYMMDD) |
| Time | C, 6 bytes (HHMMSS) |
| Memo | C, 2000 bytes |
| Logical | C, 1 byte (Y=yes; N=no) |

APPENDIX 4

What is claimed is:

1. A computing system, comprising:
   (a) an accounting data processing system comprising a memory for storing:
      an accounting database including a plurality of transactions, each of said transactions including one or more data elements stored in accordance with a first file format associated with said accounting database, and
      a plurality of output data files, each of said output data files storing a subset of said transactions in said first format;
   (b) a conversion procedure that converts transactions stored in said output data files into a socket table having a universal file format and to convert received transactions stored in said universal file format to said first file format, said universal file format including any data element and incorporating a format that is independent of a predefined structure;
   wherein said universal file format comprises a plurality of definition records and a plurality of data records, a subset of said definition records defining one or more data elements associated with each of said transactions and specifying an order for storing said data elements in one or more corresponding data records, each data record including each data element defined in said corresponding definition record in accordance with said order;
   (c) a communications link that enables transmission and receipt of one or more transmission files from one or more trading partner computing systems associated with said computing system, wherein the one or more transmission files use said universal file format such that said plurality of definition records and said plurality of data records are transmitted; and
   (d) an electronic commerce data processing system comprising a memory for storing:
      a transaction database including a plurality of said transactions in said universal file format,
      an outgoing transmission repository for storing one or more outgoing transmission files, each of said outgoing transmission files representing a subset of transactions stored in said transaction database, and
      an incoming transmission repository for storing one or more incoming transmission files received from said communication link, each of said incoming transmission files representing transactions from one or more of said associated trading partner computing systems;
   wherein said accounting data processing system utilizes said electronic commerce data processing system to exchange transactions between one or more of said associated trading partner computing systems; and
   wherein said accounting data processing system utilizes said conversion procedure to convert a first subset of said transactions represented in said first format to said universal data format prior to said transmission and to convert a second subset of said transactions received from one or more of said trading partner computing systems represented in said universal data format to said first data format.

2. The system of claim 1,
   wherein each of said definition records including a prefix and a plurality of data definition fields, each of said data definition fields including a predetermined number of subfields, each subfield specifying a different characteristic of said data element.

3. The system of claim 1,
   wherein said data elements are selected from a set consisting of standard data elements and user-defined data elements.

4. The system of claim 1,
   wherein said electronic commerce data processing system further comprising a transaction approval database listing one or more end users associated with said accounting data processing system that are able to approve one or more of said transactions; and
   wherein said electronic commerce data processing system utilizes said transaction approval database to obtain one or more approvals for a subset of said transactions prior to transmitting said transactions to one or more trading partner computing systems.

5. The system of claim 1 wherein said conversion procedure utilizes a conversion file to interpret each of said output data files.

6. The system of claim 1 wherein said transactions represent EDI and EFT type transactions.

7. The system of claim 1,
   wherein a third subset of said transactions include data elements corresponding to one or more electronic funds transfers;
   wherein said accounting data processing system utilizes one or more associated bank data processing systems to process said electronic funds transfers;
   wherein said communications link is coupled to one or more bank interface processing systems, each bank interface processing system receiving one or more of said electronic funds transfer transactions in said first format and converting a subset of said received transactions from said first format to a second format recognizable by an associated bank data processing system associated with said accounting data processing system.

8. The system of claim 7,
   wherein said communications link is coupled to a network server that receives each of said transmission files and distributes transactions contained in each received transmission file to one or more destination trading partner computing systems and bank data processing systems.

9. A distributed computing system, comprising:
   a plurality of accounting data processing systems, each accounting data processing system having an accounting database storing accounting data in an associated file format, a subset of said accounting databases utilizing an associated file format that is not recognized by one or more of said accounting data processing systems;
   a translator that converts accounting data stored in any of said associated file formats into a universal file format and converts accounting data stored in said universal file format to any of said associated file formats, said universal file format including any accounting data and incorporating a format that is independent of a prescribed structures;
   wherein said universal file format comprises a plurality of definition records and a plurality of data records, a subset of said definition records defining one or more data elements associated with each of said transactions and specifying an order for storing said data elements in one or more corresponding data records, each data record including each data element defined in said corresponding definition record in accordance with said order; and a communications network that provides one or more transmission paths between each of said accounting data processing systems, wherein the one or more transmission files use said universal file format such that said plurality of definition records and said plurality of data records are transmitted;

wherein each of said accounting data processing systems utilizes said translator to exchange accounting data between one or more accounting data processing systems.

10. The system of claim 9, wherein said definition records including a prefix and a plurality of data definition fields, each of said data definition fields including a predetermined number of subfields, each subfield specifying a different characteristic of said data element.

11. The system of claim 9, wherein said data elements are selected from a group consisting of standard data elements and user-defined data elements.

12. The system of claim 9, wherein each of said accounting data processing systems utilizing an electronic commerce processing system for transmitting and receiving accounting data between each of said accounting data processing systems, said accounting data transmitted in one or more transmission files utilizing said universal file format;

a network server receiving each of said transmission files and distributing accounting data stored in said received transmission files to one or more destination accounting data processing systems.

13. The system of claim 12, wherein said accounting data represents EDI and EFT type transactions;

a banking interface processing system coupled to said communication network for receiving one or more of said transmission files, said transmission files including accounting data representing one or more EFT type transactions, said banking interface processing system translating said received accounting data from said universal file format into a second file format for transmission to a bank data processing system in communication with said banking interface processing system.

14. The system of claim 13 wherein each of said electronic commerce processing systems further comprising a transaction approval database listing one or more end users associated with one of said accounting data processing system that are able to approve one or more transactions; and wherein said electronic commerce processing system utilizes said transaction approval database to obtain one or more approvals for a subset of said transactions prior to transmitting said transactions to said network server.

15. The system of claim 9 wherein said translator utilizes a conversion file associated with a specified accounting database, said conversion file used to interpret said specified accounting database's file format.

16. A computer readable storage medium for use with a computer system associated with an accounting database storing a plurality of transactions in a first file format, each of said transactions including one or more data elements, said computer system coupled to a network in communication with one or more client computers, said medium comprising:

a conversion procedure for translating a subset of said transactions in said first file format to a universal file format and from said universal file format to said first file format, said universal file format used to transmit said transactions to one or more client computers associated with one or more accounting databases having incompatible file formats with said first file format, said universal file format independent of a predefined structure and including any data element, said universal file format including a plurality of definition records and a plurality of data records, a subset of said definition records defining one or more data elements and an order for storing each data element in a corresponding data record, such that said plurality of definition records and said plurality of data records are transmitted.

17. The medium of claim 16 further comprising, a conversion file for use with said conversion procedure in interpreting said subset of transactions in said first file format.

18. The medium of claim 16, wherein said header records include a plurality of definition records, each definition record including a prefix and a plurality of data definition fields, each of said data definition fields including a predetermined number of subfields, each subfield specifying a different characteristic of a specific data element.

19. The medium of claim 16, wherein said data elements are selected from a group consisting of standard data elements and user-defined data elements.

20. A computer-implemented method for providing electronic commerce between a plurality of trading partners, each trading partner associated with a data processing system connected to a communication link and at least one central computing system, each of said data processing systems having an accounting database including a plurality of transactions stored in a file format that is incompatible with one or more other accounting databases, said method comprising the steps of:

extracting one or more transactions stored in one of said accounting databases associated with a specified trading partner, each of said transactions including one or more data elements;

formatting said transactions into a plurality of records associated with one or more outgoing transmission files incorporating a universal file format that stores any data element included in said transactions independent of a predefined structure, each of said transactions destined for one or more trading partners, wherein said plurality of records comprises a plurality of definition records and a plurality of data records, a subset of said definition records defining one or more data elements associated with each of said transactions and specifying an order for storing said data elements in one or more corresponding data records; and transmitting each outgoing transmission file to said central computing system for distribution of said transactions in each of said outgoing transmission files to a respective destination trading partners, wherein at least one outgoing transmission file uses said universal file format such that said plurality of definition records and said plurality of data records are transmitted.

21. The method of claim 20, wherein each of said definition records include a prefix and a plurality of data definition fields, each of said data definition fields including a predetermined number of subfields, each subfield specifying a different characteristic of said data element.

22. The method of claim 20, wherein said data elements are selected from a group consisting of standard data elements and user-defined data elements.

23. The method of claim 20 further comprising the step of:

for each trading partner:
receiving one or more incoming transmission files from an associated trading partner in said universal file format, and
converting transactions stored in each of said received incoming transmission files into a file format associated with said accounting database.

24. The method of claim 23, wherein said extracted transactions are stored in one or more output data files, each output data file including a subset of said extracted transactions in accordance with a prescribed classification; and
said method further comprising the step of providing one or more input data files containing said converted transactions, each of said input data files including a subset of said converted transactions in accordance with a prescribed classification.

25. The method of claim 20, wherein each of said trading partners is connected to one or more banking client computer systems through said communication link;
wherein said transactions include one or more EDI and EFT type transactions; and
wherein said transmitting step further distributes said EFT type transactions to one or more of said banking client computer systems.

26. The method of claim 25, wherein each of said banking client computer systems comprise a bank interface system and a bank data processing system;
said method further comprising the step of
for each banking client computer system:
verifying that each of said received transactions meets one or more approval requirements;
translating said received transactions having obtaining said approval requirements to a second data format associated with said bank data processing system; and
transmitting said translated transactions to said bank data processing system.

27. The method of claim 26, wherein said bank data processing system is in communication with a banking network including one or more automated clearing houses; and
wherein said bank data processing system transmits said translated transactions to said banking network.

* * * * *